United States Patent
Yokota

(10) Patent No.: US 8,908,122 B2
(45) Date of Patent: Dec. 9, 2014

(54) LIGHT SOURCE UNIT, LIGHTING DEVICE, DISPLAY DEVICE, TELEVISION RECEIVER, AND METHOD OF MANUFACTURING REFLECTION SHEET FOR LIGHT SOURCE UNIT

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 108 days.

(21) Appl. No.: 13/376,220

(22) PCT Filed: Apr. 6, 2010

(86) PCT No.: PCT/JP2010/056209
§ 371 (c)(1),
(2), (4) Date: Dec. 5, 2011

(87) PCT Pub. No.: WO2010/146915
PCT Pub. Date: Dec. 23, 2010

(65) Prior Publication Data
US 2012/0105764 A1    May 3, 2012

(30) Foreign Application Priority Data
Jun. 15, 2009   (JP) .................. 2009-142099

(51) Int. Cl.
G02F 1/1335    (2006.01)
(52) U.S. Cl.
CPC .... G02F 1/133605 (2013.01); G02F 1/133608 (2013.01); G02F 1/133603 (2013.01)
USPC .......................................................... 349/61
(58) Field of Classification Search
USPC .......................................................... 349/61
See application file for complete search history.

(56) References Cited

U.S. PATENT DOCUMENTS

| | | | |
|---|---|---|---|
| 2004/0076396 A1* | 4/2004 | Suga ............................. | 385/146 |
| 2006/0146538 A1* | 7/2006 | Huang et al. .................. | 362/296 |
| 2006/0164840 A1* | 7/2006 | Song et al. .................... | 362/341 |
| 2006/0279671 A1 | 12/2006 | Han et al. | |

(Continued)

FOREIGN PATENT DOCUMENTS

| | | |
|---|---|---|
| EP | 1 818 607 A1 | 8/2007 |
| JP | 2001-127344 A | 5/2001 |

(Continued)

OTHER PUBLICATIONS

Official Communication issued in International Patent Application No. PCT/JP2010/056209, mailed on Jul. 13, 2010.

(Continued)

Primary Examiner — Bumsuk Won
Assistant Examiner — Edmond Lau
(74) Attorney, Agent, or Firm — Keating & Bennett, LLP

(57) ABSTRACT

It is an object of the present invention to provide a light source unit enabling cost reduction. A light source unit of the present invention includes a plurality of LEDs 16, an LED board 17 having a surface on which the plurality of LEDs 16 is arranged, and an elongated reflection sheet 30 provided on the surface of the LED board 17 on which the LEDs are arranged. The reflection sheet 30 has a plurality of light-source-surrounding reflecting portions 31 surrounding the LEDs 16 in a plan view, and a plurality of connecting portions 32 connecting the adjacent light-source-surrounding reflecting portions 31. Each of the connecting portions 32 has a width Y2 narrower than a width Y1 of each of the light-source-surrounding reflecting portions in a short direction of the reflection sheet 30.

17 Claims, 15 Drawing Sheets

(56) References Cited

U.S. PATENT DOCUMENTS

| | | | |
|---|---|---|---|
| 2007/0035679 A1* | 2/2007 | Lee et al. | 349/58 |
| 2007/0052663 A1* | 3/2007 | Kim et al. | 345/102 |
| 2007/0257871 A1* | 11/2007 | Watanabe et al. | 345/84 |
| 2008/0049164 A1* | 2/2008 | Jeon et al. | 349/61 |
| 2008/0106902 A1* | 5/2008 | Peng et al. | 362/299 |
| 2008/0303977 A1 | 12/2008 | Sekiguchi et al. | |
| 2009/0046445 A1* | 2/2009 | Namiki et al. | 362/97.2 |
| 2009/0051707 A1* | 2/2009 | Hirata et al. | 345/690 |
| 2012/0081630 A1* | 4/2012 | Yokota | 349/58 |

FOREIGN PATENT DOCUMENTS

| | | | |
|---|---|---|---|
| JP | 2006-338020 A | | 12/2006 |
| JP | 2007-317423 A | | 12/2007 |
| JP | 2008-282754 A | | 11/2008 |
| JP | 2008282754 A | * | 11/2008 |
| JP | 2008-304839 A | | 12/2008 |
| WO | 2008/031580 A1 | | 3/2008 |

OTHER PUBLICATIONS

Yokota, "Light Source Unit, Lighting Device, Display Device, Television Receiver, and Method of Manufacturing Board for Light Source Unit", U.S. Appl. No. 13/376,214, filed Dec. 5, 2011.

Yokota, "Lighting Device, Display Device and Television Receiver", U.S. Appl. No. 13/376,217, filed Dec. 5, 2011.

* cited by examiner

FIG.6
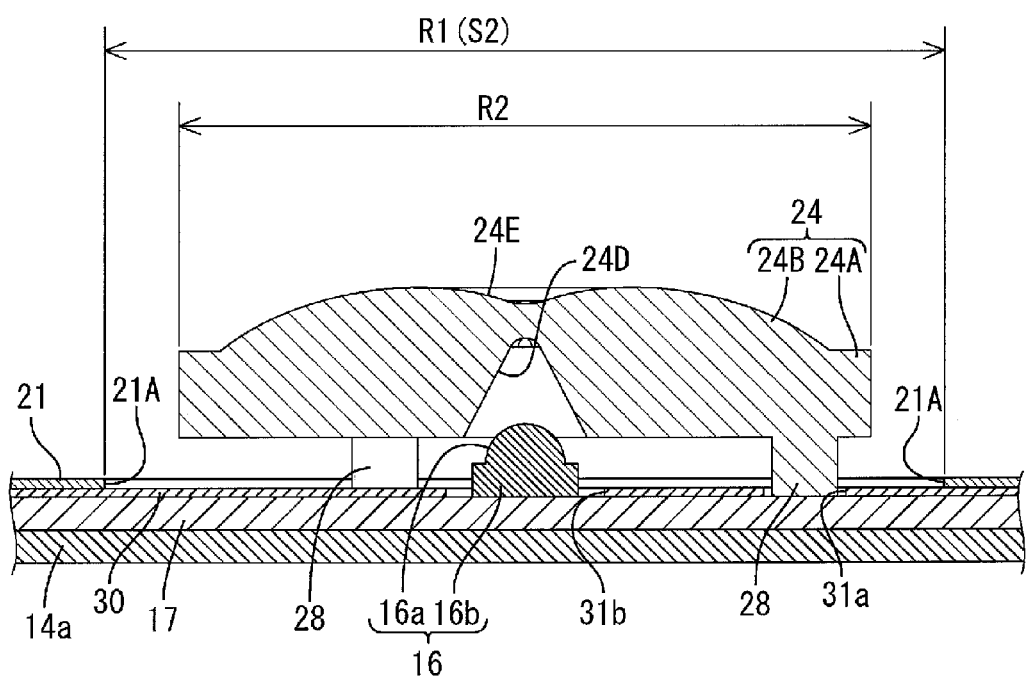
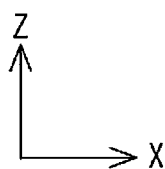

LIGHT SOURCE UNIT, LIGHTING DEVICE, DISPLAY DEVICE, TELEVISION RECEIVER, AND METHOD OF MANUFACTURING REFLECTION SHEET FOR LIGHT SOURCE UNIT

TECHNICAL FIELD

The present invention relates to a light source unit, a lighting device, a display device, a television receiver, and a method of manufacturing a reflection sheet for a light source unit.

BACKGROUND ART

In recent years, display elements of image display devices including television receivers are shifting from conventional cathode-ray tube displays to thin-screen display devices to which thin-screen display elements including liquid crystal panels and plasma display panels are applied. This enables the display device to be thinner. A liquid crystal display device requires a backlight unit as a separate lighting device because a liquid crystal panel used therein is not a light-emitting component. Examples of the backlight units include backlight units described in the following Patent Documents 1 and 2. In the backlight unit described in Patent Document 1, a light source unit is configured by arranging a plurality of LEDs (light sources) on a board, and the light sources are two-dimensionally arranged by arranging the plurality of light source units. In the backlight unit described in Patent Document 2, a white or silver reflection sheet is provided on a chassis on which a light source is provided, and thereby light from the light source is reflected to a liquid crystal panel side by the reflection sheet.

Patent Document 1: Japanese Unexamined Patent Publication No. 2007-317423
Patent Document 2: Japanese Unexamined Patent Publication No. 2008-304839

Problem to be Solved by the Invention

In order to increase a brightness of the backlight unit, a high-reflectance reflection sheet having good light use efficiency is preferably used. However, use of the high-reflectance reflection sheet generally increases manufacturing cost. In order to provide a low-cost backlight unit to a customer, cost reductions of the backlight unit and the light source unit which is a component thereof are always required.

DISCLOSURE OF THE PRESENT INVENTION

The present invention was accomplished in view of the above circumstances. It is an object of the present invention to provide a light source unit capable of cost reduction. It is another object of the present invention to provide a lighting device, a display device, and a television receiver including the light source unit, and a method of manufacturing a reflection sheet for a light source unit.

Means for Solving the Problem

A light source unit according to the present invention includes a plurality of light sources, a board having a surface on which the plurality of light sources is arranged, and an elongated reflection sheet provided on the surface of the board. The reflection sheet has a plurality of light-source-surrounding reflecting portions and a plurality of connecting portions. Each of the light-source-surrounding reflecting portion surrounds each of the light sources in a plan view, and each connecting portion connects the light-source-surrounding reflecting portions that are adjacent to each other, and each of the connecting portions has a width smaller than a width of each of the light-source-surrounding reflecting portions in a shorter direction of the reflection sheet.

Light from the light sources can be reflected by provision of the reflection sheet, and a brightness can be improved. Because the light-source-surrounding reflecting portions are connected by the connecting portions in the reflection sheet, the reflection sheet has improved ease of handling as compared with a configuration supposedly including a plurality of light-source-surrounding reflecting portions separately without being connected. Thus, for example, the reflection sheet may achieve cost reduction. Each of the light-source-surrounding reflecting portions needs to have a certain size (width) in order to reflect the light from the light sources. On the other hand, each of the connecting portions connecting the light-source-surrounding reflecting portions may not necessarily have the same width as that of each of the light-source-surrounding reflecting portions. In the present invention, the width of each of the collateral connecting portions in the short direction of the reflection sheet is set to be narrower than that of each of the light-source-surrounding reflecting portions. Thereby, the total area of the reflection sheet can be reduced as compared with a rectangular reflection sheet having the same width as that of each of the light-source-surrounding reflecting portions over the whole length, and cost reduction can be realized. From the above, material cost of the reflection sheet can also be reduced in addition to the reduction of handling cost, and cost reduction can be greatly realized as a whole.

BRIEF DESCRIPTION OF THE DRAWINGS

FIG. 6 is a sectional view illustrating an enlarged circumference of an LED in FIG. 4;

BEST MODE FOR CARRYING OUT THE INVENTION

First Embodiment

(1) Configuration

A first embodiment of the present invention will be described with reference to FIGS. 1 to 11. In the present embodiment, an X-axis, a Y-axis, and a Z-axis are shown in a part of each of the drawings. Directions of the axes are drawn to be set to directions shown in each of the drawings. An upper side shown in FIGS. 4 and 5 corresponds to a front side. A lower side thereof corresponds to a rear side.

Figure 1:
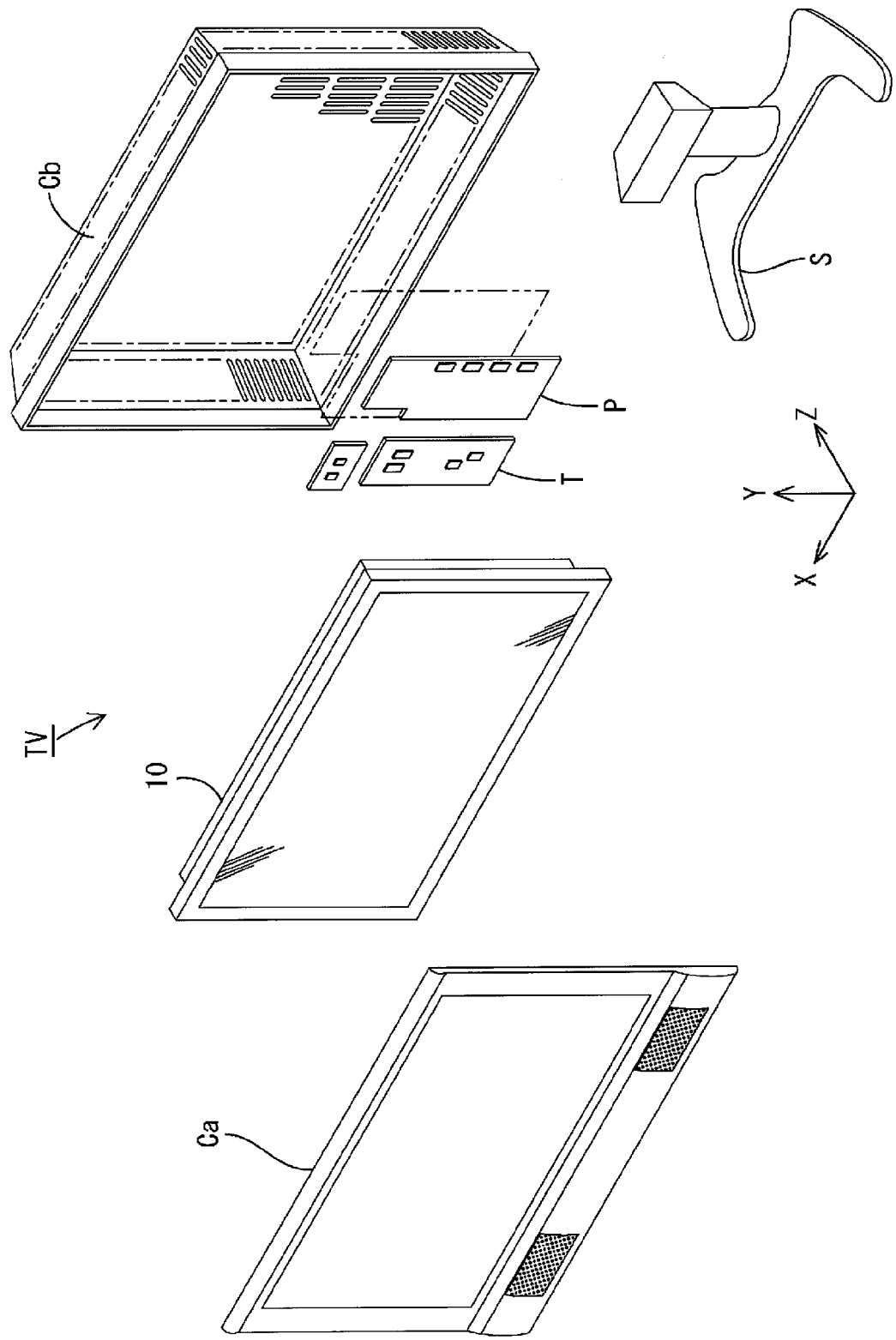
FIG. 1 is an exploded perspective view illustrating a configuration of a television receiver according to a first embodiment of the present invention.
Figure 2:
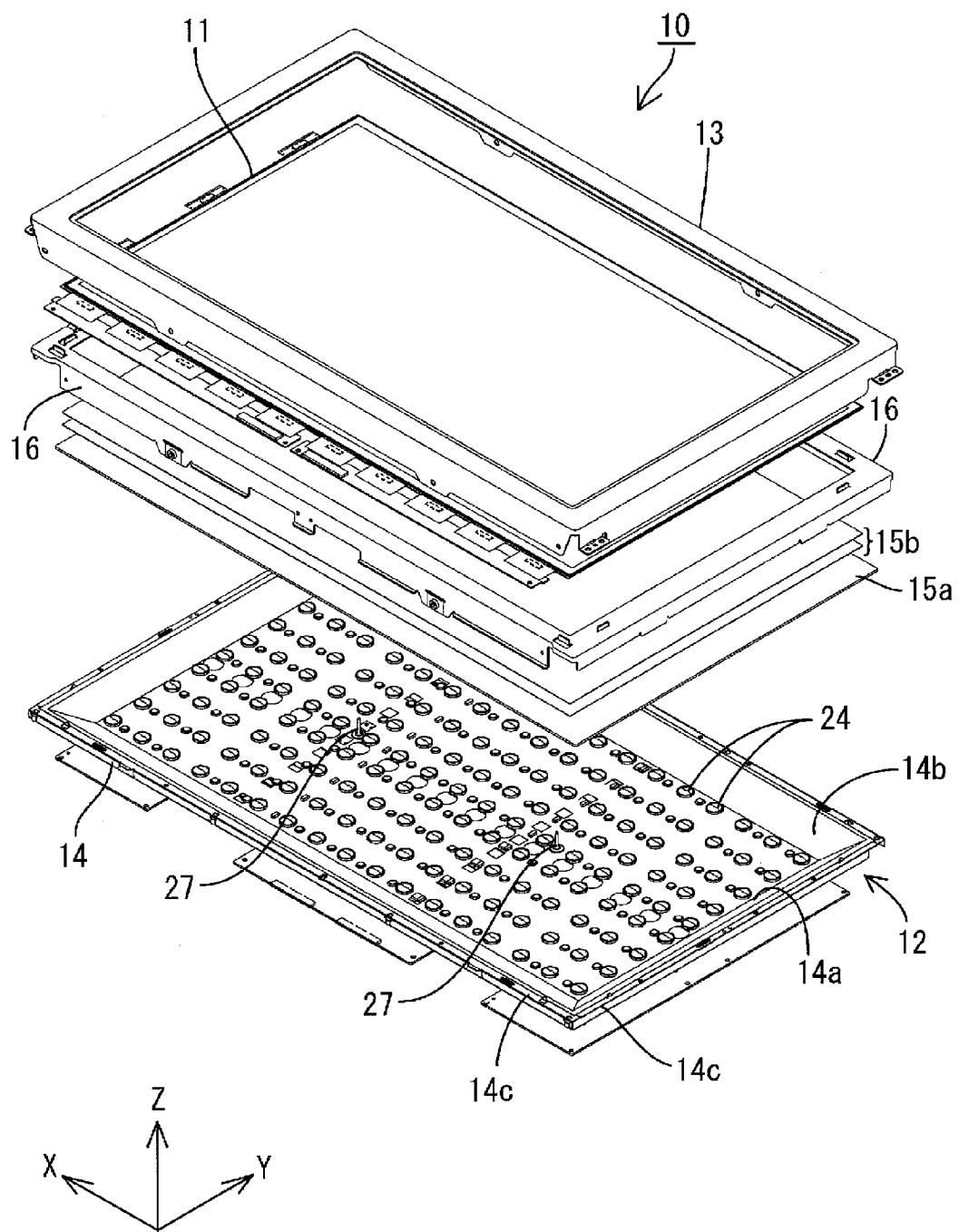
FIG. 2 is an exploded perspective view illustrating a schematic configuration of a liquid crystal display device.

As illustrated in FIG. 1, a television receiver TV of the present embodiment includes a liquid crystal display device 10 (display device), front and rear cabinets Ca, Cb which house the liquid crystal display device 10 therebetween, a power source P, and a tuner T. The television receiver TV is supported by a stand S such that a display surface thereof matches a vertical direction (Y-axis direction). An entire shape of the liquid crystal display device 10 is a landscape rectangular. As illustrated in FIG. 2, the liquid crystal display device 10 includes a backlight unit 12 (lighting device) which is an external light source, and a liquid crystal panel 11 (display panel) configured to provide display using light from the lighting device 12. The liquid crystal panel 11 and the backlight unit 12 are integrally held by a frame shaped bezel 13 and the like.

Next, the liquid crystal panel 11 and the backlight unit 12 included in the liquid crystal display device 10 will be described. Of these, the liquid crystal panel 11 has a rectangular shape in a plan view. The liquid crystal panel 11 is configured such that a pair of glass substrates is bonded together with a predetermined gap therebetween and liquid crystal is enclosed between the glass substrates. One of the glass substrates is provided with switching elements (for example, TFTs) connected to source lines and gate lines that are perpendicular to each other, pixel electrodes connected to the switching elements, an alignment film, and the like. The other substrate is provided with a color filter having color sections such as R (red), G (green) and B (blue) color sections arranged in a predetermined pattern, counter electrodes, and an alignment film. Outer surfaces of the substrates have Polarizing plates 11a, 11b attached thereto.

Figure 3:
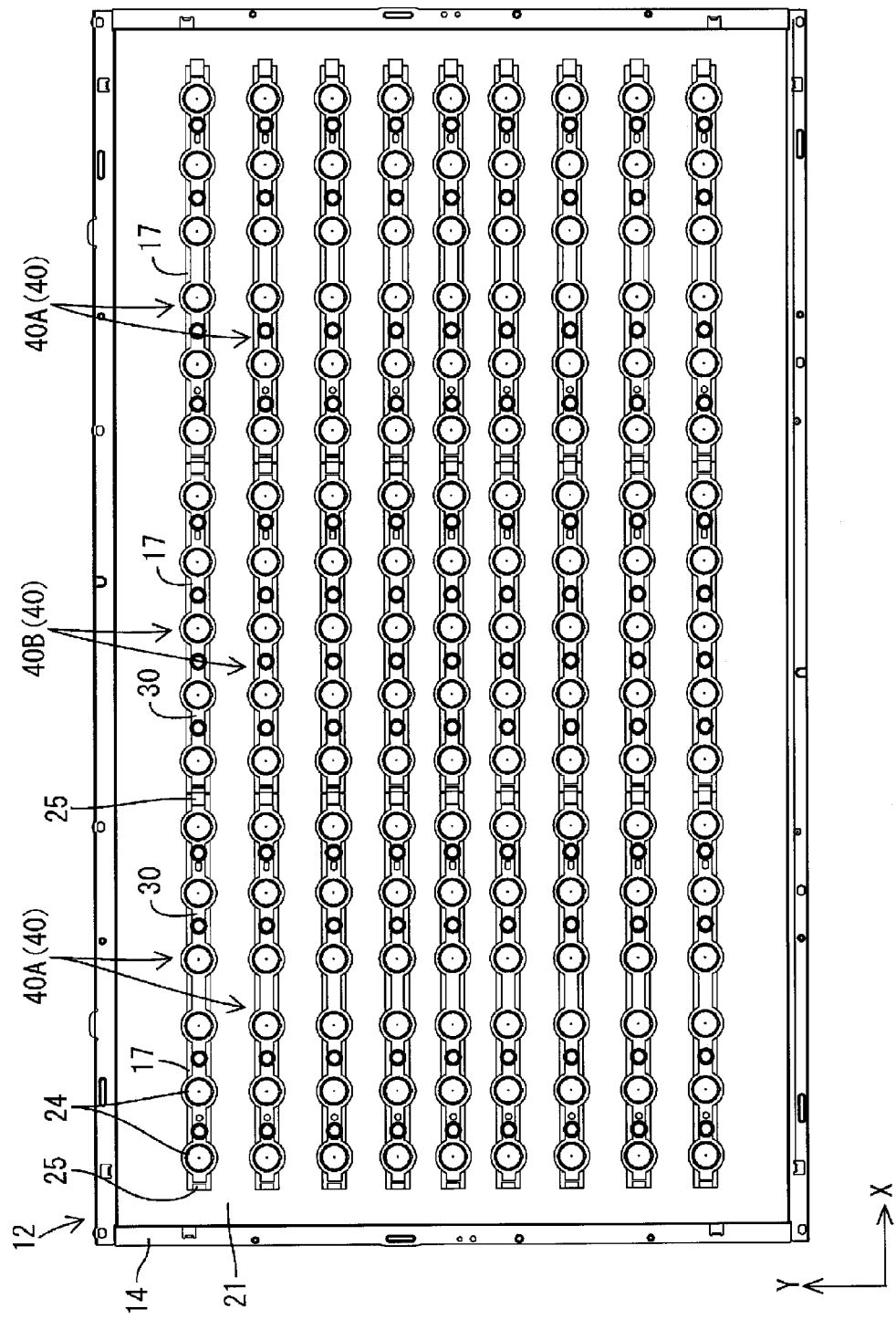
FIG. 3 is a plan view of a backlight unit.

Then, the backlight unit 12 will be described in detail. As illustrated in FIGS. 2 and 3, the backlight unit 12 includes a chassis 14, a plurality of light source units 40 attached to the chassis 14, a chassis-side reflection sheet 21 covering a front side of the chassis 14, a diffuser 15a provided to cover an opening of the chassis 14, and a plurality of optical sheets 15b (two in the present embodiment) laminated on a front side of the diffuser 15a. The chassis 14 has a substantially box-shape opens to the front side (the liquid crystal panel 11 side, the light output side).

Figure 4:
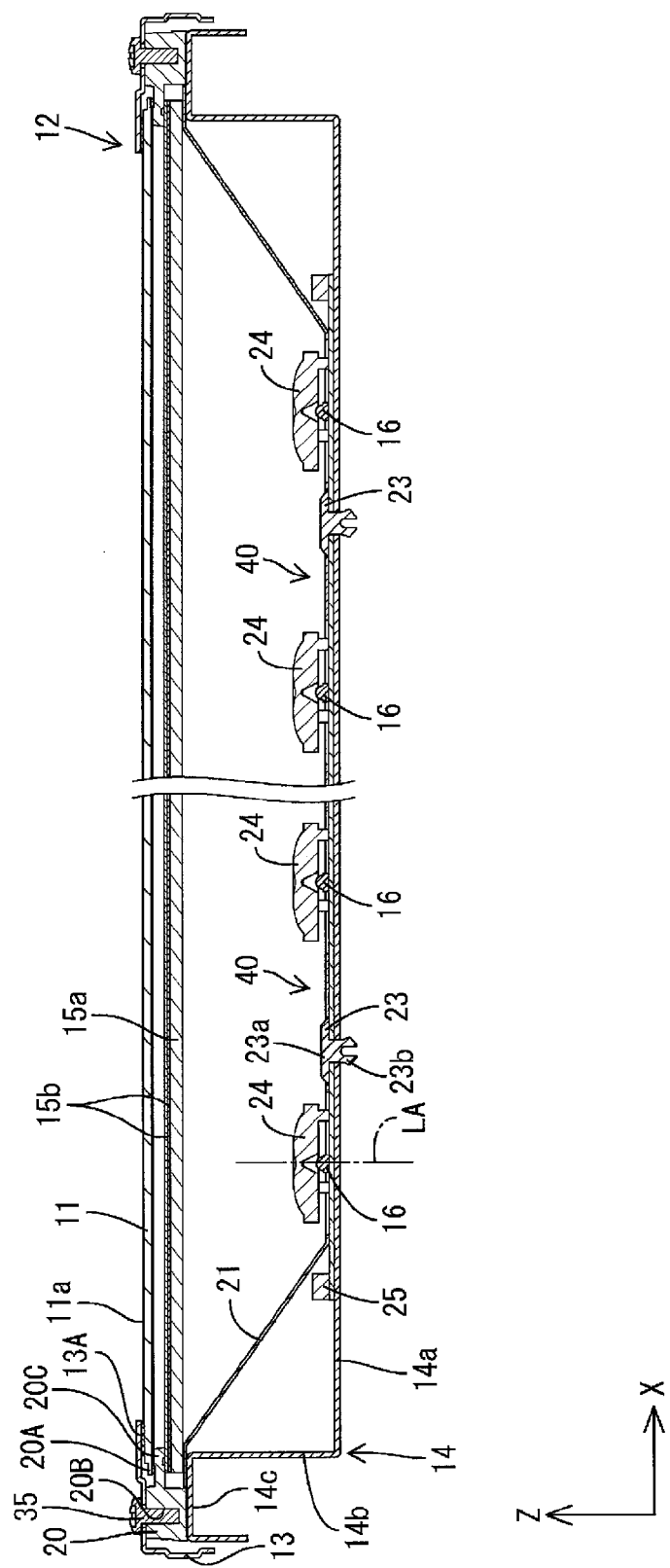
FIG. 4 is a sectional view illustrating a state where the liquid crystal display device is cut along a long-side direction thereof.

The chassis 14 is made of metal. As illustrated in FIGS. 3 and 4, the chassis 14 includes a rectangular bottom plate 14a like the liquid crystal panel 11, side plates 14b each of which rises from an outer edge of the corresponding side of the bottom plate 14a, and receiving plates 14c outwardly overhanging from a rising edge of each of the side plates 14b. An entire shape of the chassis 14 is a rectangular shape in a plan view, and a substantially shallow box shape (approximately shallow dish shape) opened to the front side. A longitudinal direction of the chassis 14 is aligned with a horizontal direction (X-axis direction), and a short-side direction thereof is aligned with the vertical direction (Y-axis direction).

The chassis-side reflection sheet 21 is made of a synthetic resin, for example. A surface of the chassis-side reflection sheet 21 is colored white, which has excellent reflectivity. The chassis-side reflection sheet 21 is provided so as to cover substantially the whole area of the bottom plate 14a and inner surface sides of the side plates 14b of the chassis 14. The chassis-side reflection sheet 21 has through holes 21A in places corresponding to diffusion lenses 24 of each of the light source units 40 to be described later (see FIG. 6). A size (diameter R1) of each of the through holes 21A in a plan view is set to be greater than an outer diameter (R2 of FIG. 6) of each of the diffusion lenses 24. This prevents the chassis-side reflection sheet 21 from interfering with the diffusion lenses 24 while a slight error (for example, an error of a size or a place of forming a hole) is tolerated when each of the through holes 21A is formed. As a result, the chassis-side reflection sheet 21 can be provided on an inner surface of the bottom plate 14a.

Figure 5:
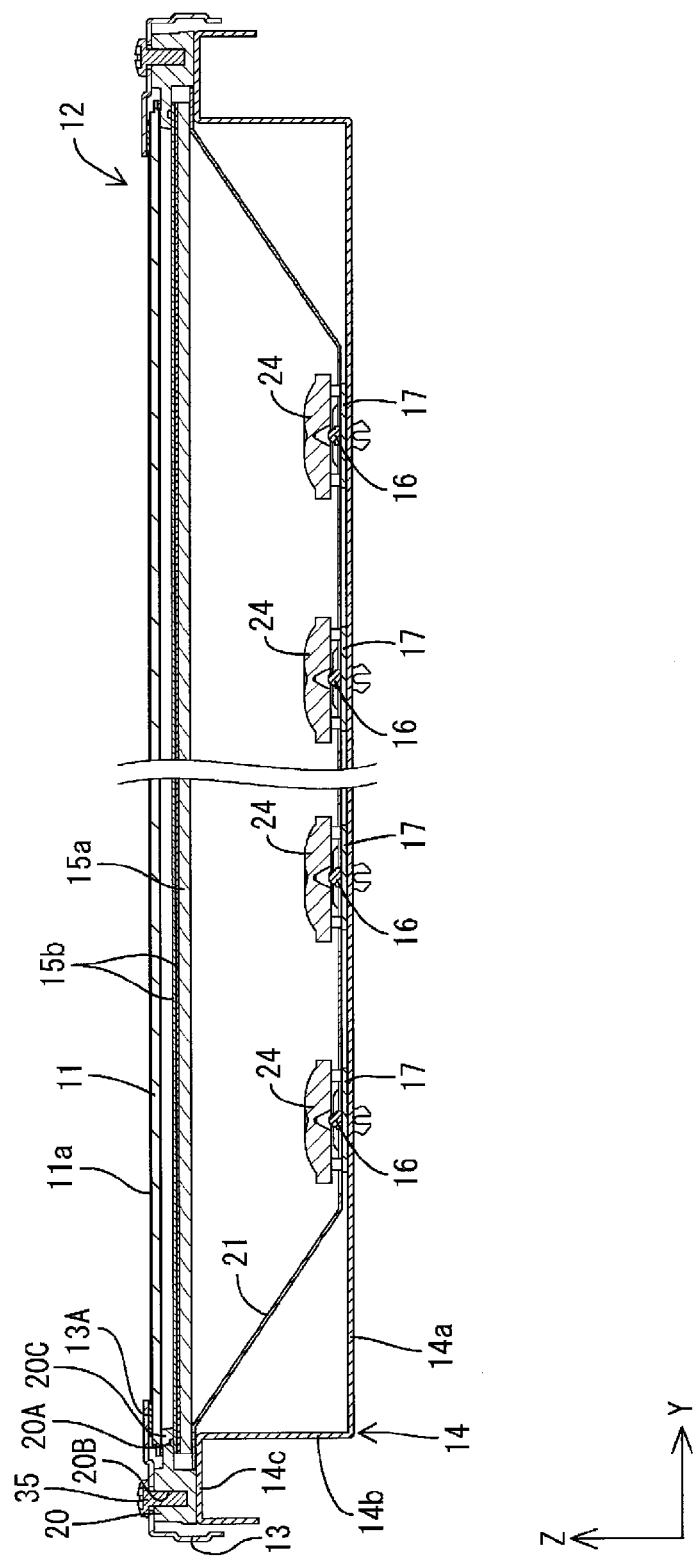
FIG. 5 is a sectional view illustrating a state where the liquid crystal display device is cut along a short-side direction thereof.

The chassis-side reflection sheet 21 is obliquely inclined in a periphery portion of the bottom plate 14a, and covers inner surfaces of the side plates 14b. As illustrated in FIGS. 4 and 5, a periphery portion of the chassis-side reflection sheet 21 is supported by the receiving plates 14c of the chassis 14. Light emitted from LEDs 16 of the light source units 40 can be reflected to the diffuser 15a side by the chassis-side reflection sheet 21, and thereby a brightness of the backlight unit 12 can be increased. FIG. 3 illustrates a state where the chassis-side reflection sheet 21 is removed.

The diffuser 15a has numerous diffusing particles dispersed in a transparent resin base material having a predetermined thickness, and has a function to diffuse transmission light. A plate thickness of each of the optical sheets 15b is thinner than a thickness of the diffuser 15a. A diffuser sheet, a diffusion lens sheet, and a reflection type polarizing sheet and the like are used as the optical sheets 15b, and can be suitably selected and used.

The diffuser 15a has a periphery portion superposed on the front side of the periphery portion of the chassis-side reflection sheet 21. Each of the receiving plates 14c of the chassis 14 has a frame 20 placed from the front side thereon. The frame 20 has a protruding portion 20C protruding to an inner side of the chassis 14. The protruding portion 20C can press a periphery portion of the optical sheets 15b from the front side. The chassis-side reflection sheet 21, the diffuser 15a, and the optical sheets 15b are sandwiched between the receiving plates 14c of the chassis 14 and the frame 20 by the above configuration. The protruding portion 20c of the frame 20 has a periphery portion of the liquid crystal panel 11 placed on the front side thereof through a buffer member 20A. The frame 20 has an attaching hole 20B thereon to fix the bezel 13 to the attaching hole 20B with a screw 35. Thereby, the liquid crystal panel 11 is pressed from the front side through the buffer member 13A by the bezel 13, and the liquid crystal panel 11 can be sandwiched between the frame 20 and the bezel 13.

Each of the light source units 40 includes a plurality of LEDs 16 (Light-emitting diode) which is a light source, an LED board 17 on which the plurality of LEDs 16 is mounted on a straight line, a reflection sheet 30 provided on the LED board 17, and the diffusion lenses 24 provided on the LED board 17. The present embodiment includes two kinds of light source units 40 in which the number of the LEDs 16 and a length of the X-axis direction are different. Specifically, as illustrated in FIG. 3, the present embodiment includes the light source unit 40 (hereinafter, referred to as alight source unit 40A) on which the six LEDs 16 are mounted, and the light source unit 40 (hereinafter, referred to as a light source unit 40B) on which the five LEDs 16 are mounted. The seventeen LEDs 16 are arranged in total in the X-axis direction on the chassis 14 by connecting the light source unit 40A, the light source unit 40B, and the light source unit 40A in this order in the X-axis direction. The light source units 40 aligned in the X-axis direction are electrically connected through connectors 25 to be described later. The connected light source units 40A and 40B are arranged in a plurality of rows (nine rows in the present embodiment) with a predetermined interval in a short direction of the chassis 14 (a direction perpendicular to the longitudinal direction, the Y-axis direction). Thereby, the plurality of light source units 40, consequently, the plurality of LEDs 16 is two-dimensionally arranged on the chassis 14.

As described above, the LEDs 16 are arranged by combining the two kinds of light source units 40A and 40B. Change of combination of the light source units 40A and 40B can correspond to the liquid crystal display devices 10 and the backlight units 12 having different screen sizes. This can reduce the kind of the light source units as compared with a case where a light source unit having a length as exclusive design corresponding to each of sizes of the liquid crystal display devices 10 and the backlight units 12 is supposedly prepared, and can reduce cost. In addition to the above-mentioned two kinds of light source units 40A and 40B, the light source units 40 having different number of the LEDs 16 may be combined. For example, three kinds of light source units of the light source units 40A and 40B and a light source unit 40 (not illustrated) on which the eight LEDs 16 are mounted are suitably combined, and the three kinds of light source units are attached to the chassis 14. Thereby, this configuration can correspond to the liquid crystal display devices 10 and the backlight units 12 which have different screen sizes such as 26 inches, 32 inches, 37 inches, 40 inches, 42 inches, 46 inches, 52 inches, and 65 inches.

Next, components of the light source units 40 will be described. As described above, in the present embodiment, the light source unit 40A on which the six LEDs 16 are mounted, and the light source unit 40B on which the five LEDs 16 are mounted are exemplified as the light source units 40. However, because the light source unit 40A has the same configuration as that of the light source unit 40B except for the number of the LEDs 16 to be mounted, only the light source unit 40A will be described.

The LEDs 16 are so-called surface mounting type LEDs, and are mounted on a front side surface of the LED board 17. Each of the LEDs 16 includes a board portion 16b and a tip portion 16a having a semispherical shape. An optical axis LA of the LED 16 is coaxial to the Z-axis. Each of the LEDs 16 is obtained by combining an LED chip emitting blue single color light with a fluorescent material, to emit white color light. A rear surface of the board portion 16b of each of the LEDs 16 is soldered to a land (not illustrated) of the LED board 17.

Figure 8:
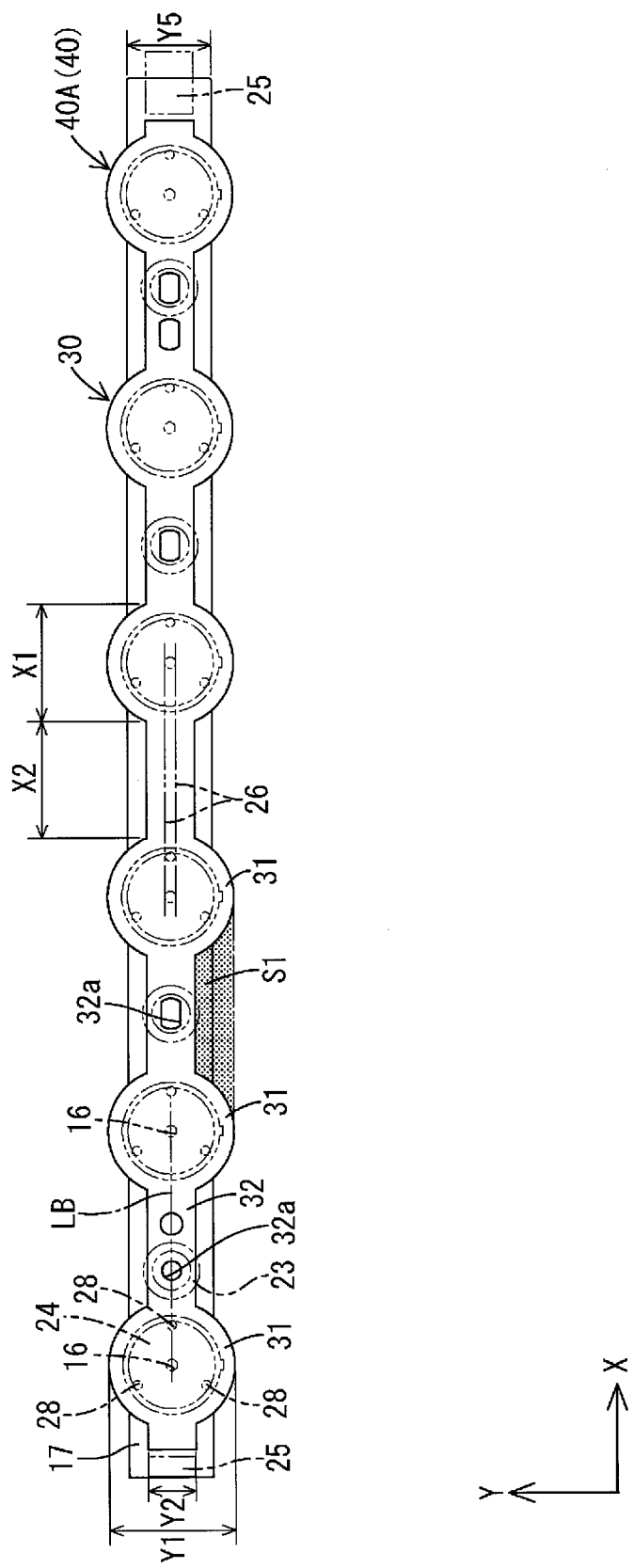
FIG. 8 is a plan view of a light source unit.

For example, a copper clad laminate obtained by sticking a copper foil on a glass-epoxy substrate (FR-4) is used as the LED board 17. As illustrated in FIGS. 3 and 8, each of the LED boards 17 has a rectangular shape extending in the longitudinal direction of the chassis 14. Each of the LED boards 17 has an external control unit (not illustrated) connected thereto. Electrical power required for lighting each of the LEDs 16 can be supplied from the control unit, and each of the LEDs 16 can be driven and controlled.

Figure 7:
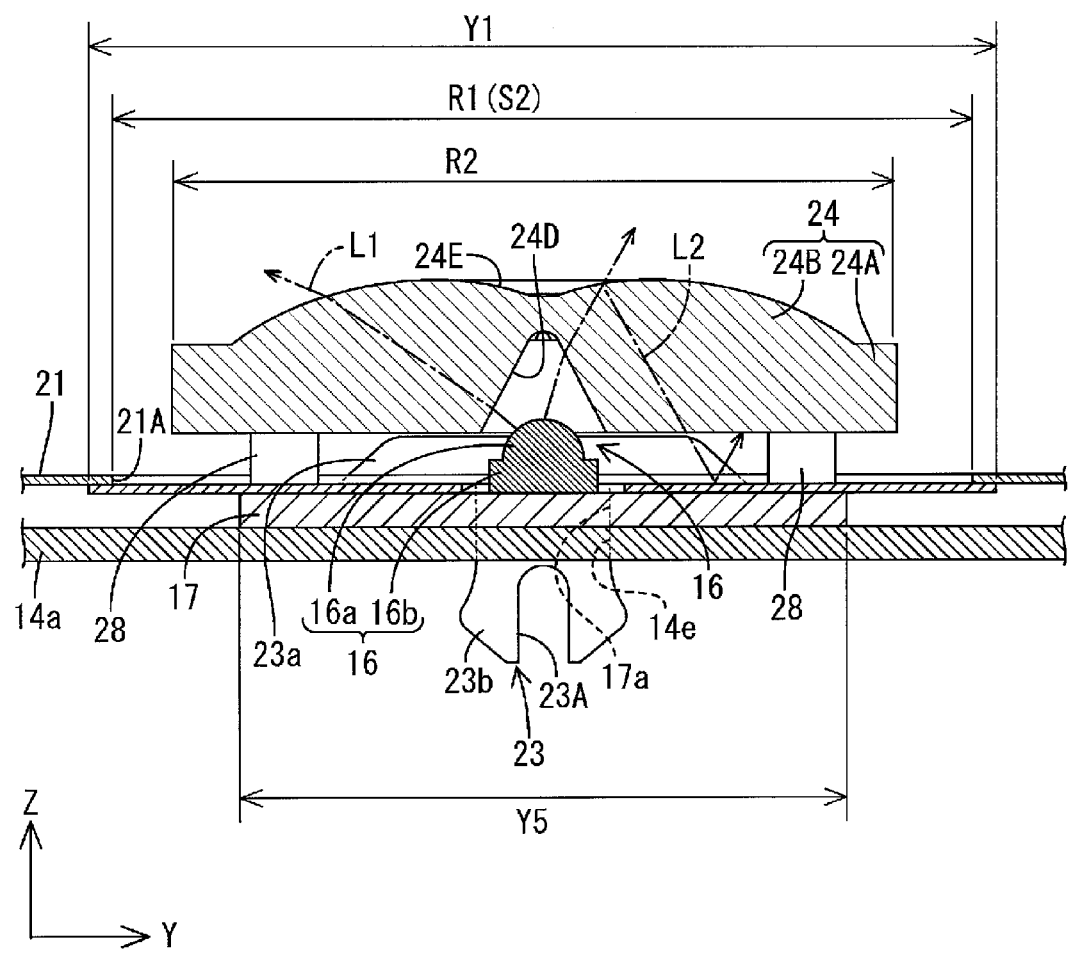
FIG. 7 is a sectional view illustrating an enlarged circumference of an LED in FIG. 5.

Each of the LED boards 17 has attaching holes 17a formed in predetermined places thereof. A clip 23 for fixing each of the LED boards 17 to the chassis 14 is inserted into each of the attaching holes 17a. The chassis 14 has attaching holes 14e having the same diameter as each of the attaching holes 17a formed in places corresponding to the attaching holes 17a. The clip 23 is made of a synthetic resin, for example. As illustrated in FIG. 7, the clip 23 includes an attaching plate 23a which is parallel to the LED boards 17, and an inserting portion 23b protruding from the attaching plate 23a to the chassis 14 side along a plate thickness direction (Z-axis direction) of each of the LED boards 17. The connectors 25 are mounted on both ends in a longitudinal direction of each of the LED boards 17.

Each of the LED boards 17 has wirings 26 formed on a rear surface thereof. The wirings 26 are formed to connect the LEDs 16, and supply electrical power to the LEDs 16. The wirings 26 are formed by, for example, pattern printing on each of the LED boards 17. The wirings 26 are longitudinally arranged except for places of forming the attaching holes 17a in each of the LED boards 17. Only a part of the wirings 26 is illustrated in FIG. 8 (two-dot chain lines in FIG. 8).

The inserting portion 23b is set such that a base end side diameter thereof is slightly smaller than that of each of the attaching holes 17a, and is set such that a tip side diameter thereof is greater than that of each of the attaching holes 17a. The inserting portion 23b has a groove portion 23A having a shape denting to the front side formed in a tip portion thereof. Thereby, the tip portion of the inserting portion 23b can be elastically deformed in a radial direction. When the inserting portion 23b of the clip 23 is inserted into each of the attaching holes 17a and each of the attaching holes 14e, a tip side of the inserting portion 23b is locked from the rear side of each of the attaching holes 17a by the above configuration. Thereby, each of the LED boards 17 is fixed to the chassis 14 by the clip 23.

As illustrated in FIG. 2, support pins 27 are provided to protrude to the front side from surfaces of the clips 23 located near a center of the chassis 14. When the diffuser 15a bends, the support pins 27 supports the diffuser 15a from the rear side, thereby functioning to suppress bending of the diffuser 15a.

Each of the diffusion lenses 24 is formed of a transparent member (for example, acrylic or polycarbonate) having a refractive index higher than that of air. Each of the diffusion lenses 24 functions to refract light emitted from each of the LEDs 16 to diffuse the light. Each of the diffusion lenses 24 has a circular shape in a plan view and includes each of the LEDs 16 at a center thereof. The diffusion lenses 24 are provided on each of the LED boards 17 so as to cover the front side (tip portion 16a side) of each of the LEDs 16. Each of the diffusion lenses 24 includes a base portion 24A having a circular plate shape in a plan view and a flat spherical portion 24B having a flat semispherical shape. As illustrated in FIGS. 7 and 8, each of the diffusion lenses 24 has three leg portions 28 protruding to the rear side near a periphery portion thereof. The three leg portions 28 are arranged at substantially equal intervals (intervals of about 120 degrees) from a center part of each of the diffusion lenses 24 in a plan view (illustrated by dashed lines of FIG. 8). For example, the three leg portions 28 are bonded to each of the LED boards 17 by an adhesive or a thermosetting resin. As illustrated in FIG. 7, each of the above-mentioned LED boards 17 has a width Y5, in a short direction (short-side direction), greater than a length obtained by summing an interval between the leg portions 28 of each of the diffusion lenses 24 and lengths of the leg portions 28 themselves in a section view in the short direction. Therefore, each of the diffusion lenses 24 can be supported. That is to say, the width Y5 of each of the LED boards 17 in the short direction is set to the minimum size configured to support each of the diffusion lenses 24. Thereby, an area of each of the LED boards 17 can be reduced as much as possible, and cost can be reduced.

Each of the diffusion lenses 24 has a concave portion 24D having a substantially conical shape formed in a lower surface thereof by denting a place located immediately above each of the LEDs 16 to the front side (upper side of FIG. 7). Each of the diffusion lenses 24 has a concave portion 24E having an substantially mortar shape formed in a top portion thereof. An inner peripheral surface of the concave portion 24E has a circular arc shape in a section view. As illustrated in FIG. 7, the light from each of the LEDs 16 is refracted over a wide angle on a boundary between each of the diffusion lenses 24 and air by the above configuration, and is diffused to circumference of each of the LEDs 16 (light ray L1). A part of the light is reflected on a boundary between the concave portion 24E of each of the diffusion lenses 24 and air (light ray L2). Thereby, a phenomenon in which the top portion of each of the diffusion lenses 24 is brighter than circumference thereof can be prevented, and uneven brightness can be suppressed.

Next, a configuration of the reflection sheet 30 will be described in detail. The reflection sheet 30 is provided on a front side surface of each of the LED boards 17, and reflects light to the front side. For example, the reflection sheet 30 is colored white, which has excellent reflectivity. For example, the reflection sheet 30 has a so-called dielectric multilayer film structure made of an insulating synthetic resin material and obtained by laminating numerous dielectric layers having different refractive indexes. In this context, for example, the "dielectric multilayer film structure" means a configuration having a thickness of one fourth of a wavelength of visible light and obtained by laminating numerous dielectric layers (not illustrated) having different refractive indexes. The structure can exhibit high-efficient reflective performance hardly involving diffusion. Examples of the reflection sheet 30 having such a configuration include "ESR" (trade name) using a polyester resin as a dielectric material and manufactured by Sumitomo 3M limited.

The reflection sheet 30 has an elongated shape along the longitudinal direction of the chassis, and has a 180-degree rotationally symmetric shape. The reflection sheet 30 includes a plurality of light-source-surrounding reflecting portions 31 surrounding each of the LEDs 16 in a plan view, and a plurality of connecting portions 32 connecting the adjacent light-source-surrounding reflecting portions 31.

Each of the light-source-surrounding reflecting portions 31 has a circular shape. Each of the light-source-surrounding reflecting portions 31 has an outer diameter Y1 (a width in the short direction) greater than an outer diameter R2 of each of the diffusion lenses 24 and the diameter R1 of each of the through holes 21A in the chassis-side reflection sheet 21. Thus, each of the light-source-surrounding reflecting portions 31 is provided in a range greater than each of the diffusion lenses 24 in a plan view (a state viewed from the upper side of FIG. 7), and is provided in a range greater than each of the through holes 21A in a plan view. Each of the light-source-surrounding reflecting portions 31 is provided in the substantially whole area of a region S2 corresponding to each of the through holes 21A. In a plan view, a periphery portion of each of the light-source-surrounding reflecting portions 31 is provided on the periphery portion of each of the through holes 21A. Therefore, when light is made incident on the region S2 (in other words, a region where the chassis-side reflection sheet 21 is not provided), the light can be reflected to the front side (particularly the diffusion lens 24 side) by each of the light-source-surrounding reflecting portions 31, and a brightness can be increased.

Examples of the light made incident on the region S2 include light reflected by the chassis-side reflection sheet 21, the diffuser 15a, and the optical sheet 15b and the like in addition to light reflected by each of the diffusion lenses 24. On the contrary, in the above configuration, the chassis-side reflection sheet 21 overlaps with a region on which at least the reflection sheets 30 are not provided on the inner surface of the bottom plate 14a of the chassis 14. Each of the above-mentioned LED boards 17 has the width Y5 (at least a width of a portion of each of the LED boards 17 overlapping with each of the light-source-surrounding reflecting portions 31 in a plan view) narrower than the outer diameter Y1 of each of the light-source-surrounding reflecting portions 31.

The light-source-surrounding reflecting portions 31 are arranged at constant intervals along the X-axis direction. In a plan view, each of the light-source-surrounding reflecting portions 31 has an LED inserting hole 31b having a diameter greater than an outer diameter of the tip portion 16a of each of the LEDs 16 formed in the center thereof. Thereby, each of the LEDs 16 can be provided in the center of each of the light-source-surrounding reflecting portions 31 in a plan view. Each of the light-source-surrounding reflecting portions 31 has leg portion inserting holes 31a into which the leg portions 28 can be inserted formed in places corresponding to the leg portions 28 of each of the diffusion lenses 24.

Each of the connecting portions 32 has a long rectangular shape in the X-axis direction. Each of the connecting portions 32 has a width Y2 in the short direction (short-side direction, Y-axis direction) narrower than the outer diameter Y1 (the width in the short direction) of each of the light-source-surrounding reflecting portions 31. The connecting portions 32 are arranged along a straight line LB connecting centers of the adjacent light-source-surrounding reflecting portions 31. The specific connecting portion 32 of the connecting portions 32 has an attaching hole 32a into which the clip 23 can be inserted formed in a place corresponding to the attaching hole 17a of each of the LED boards 17.

When the backlight unit 12 according to the present embodiment is optically designed, light emitted from each of the diffusion lenses 24 is the most important element. The light emitted from each of the diffusion lenses 24 is strongly influenced by the reflectance of the reflection sheet 30 (particularly light-source-surrounding reflecting portions 31) besides the brightness of each of the LEDs 16 itself. In the present embodiment, an amount of the light emitted from each of the diffusion lenses 24 is sufficiently secured by highly setting the reflectance of the reflection sheet 30, to increase the brightness of the backlight unit 12. In addition, the chassis-side reflection sheet 21 desirably has a high reflectance equivalent to that of the reflection sheet 30. However, a degree of importance of the chassis-side reflection sheet 21 when the backlight unit 12 is optically designed is lower than that of the reflection sheet 30. An area of the chassis-side reflection sheet 21 is also greater than that of the reflection sheet 30. Therefore, the chassis-side reflection sheet 21 has a reflectance lower than that of the reflection sheet 30 (generally, having cost lower than that of the reflection sheet 30). Thereby, the backlight unit 12 of the present embodiment secures a sufficient brightness, and realizes cost reduction as compared with the configuration in which the chassis-side reflection sheet 21 has a high reflectance equivalent to that of the reflection sheet 30.

(2) Method of Manufacturing Reflection Sheets 30

Figure 9:
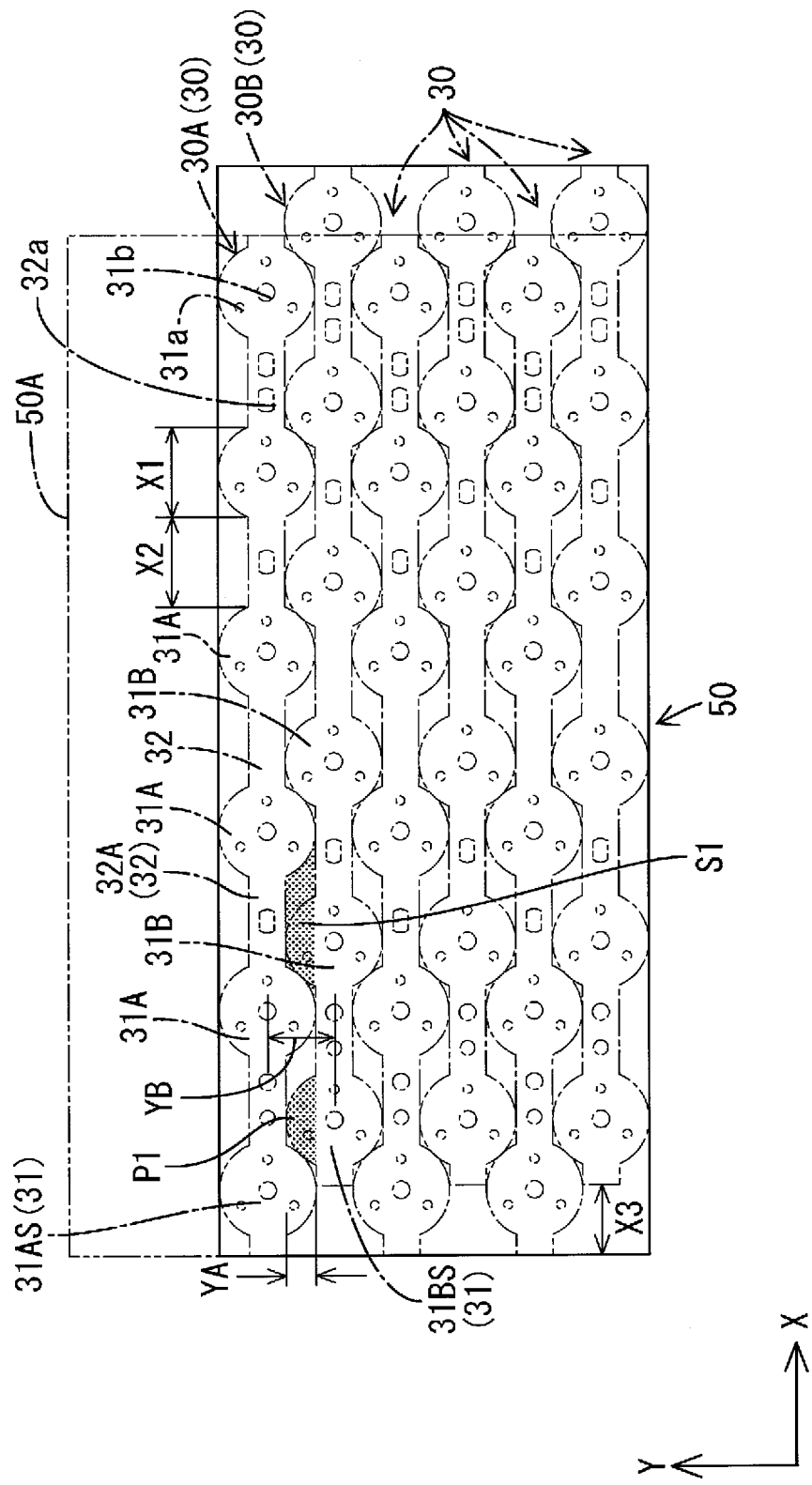
FIG. 9 is a plan view illustrating a method of manufacturing reflection sheets.

Next, a method of manufacturing the reflection sheets 30 (reflection sheets for a light source unit) will be described. In the present embodiment, as illustrated in FIG. 9, a plurality of reflection sheets 30 (six in FIG. 9) is manufactured by dividing a sheet base material 50 having a rectangular shape. First, a method of allotting the reflection sheets 30 to the sheet base material 50 will be described. The plurality of reflection sheets 30 is arranged on the sheet base material 50 in a state where the reflection sheets 30 are adjacent to each other in the Y-axis direction with longitudinal directions thereof aligned with each other. At this time, the reflection sheets 30 are arranged such that reflection sheets 30 of even number of stages are shifted to the reflection sheets 30 of odd number of stages in the longitudinal direction (X-axis direction). The reflection sheet 30 (a first reflection sheet) of the first stage (the top stage in FIG. 9) and the reflection sheet 30 (a second reflection sheet) of the second stage adjacent thereto will be described as examples. For the purposes of illustration, the reflection sheet 30 of the first stage is designated by symbol 30A, and the reflection sheet 30 of the second stage is designated by symbol 30B.

The reflection sheet 30B is shifted to the reflection sheet 30A in the X-axis direction (shift amount X3). Thereby, the reflection sheet 30A and the reflection sheet 30B are arranged such that each of the light-source-surrounding reflecting portions 31 of the reflection sheet 30B (hereinafter, light-source-surrounding reflecting portions 31B) is fitted between adjacent light-source-surrounding reflecting portions 31 of the reflection sheet 30A (hereinafter, light-source-surrounding reflecting portions 31A). That is, each of the reflection sheets 30 has an outer shape such that each of the light-source-surrounding reflecting portions 31B of the reflection sheet 30B is fitted between adjacent light-source-surrounding reflecting portions 31A of the reflection sheet 30A. As illustrated in FIG. 9, herein, the fitting means a state where at least a part of the light-source-surrounding reflecting portion 31B is arranged in apart of a region S1 (a hatching pattern place of FIG. 9) whose three sides are surrounded by the adjacent light-source-surrounding reflecting portions 31A and connecting portions 32 connecting the light-source-surrounding reflecting portions 31A.

The reflection sheets 30 of the third and subsequent stages are also allotted on the sheet base material 50 as in the arrangement of the reflection sheets 30A and 30B. The sheet base material 50 is divided based on the above allotment to form the plurality of reflection sheets 30. LED inserting holes 31$b$, leg portion inserting holes 31$a$, and attaching holes 32$a$ are formed in each of the reflection sheets 30 simultaneously with dividing the sheet base material. The dividing and the hole forming may not be necessarily performed simultaneously. The dividing and the boring may be performed in order. The sequence of work in that case can be suitably changed.

As described above, the sheet base material 50 is divided such that the reflection sheets 30A and 30B are allotted on the sheet base material 50. Therefore, for example, a length of a sheet base material 50A in the Y-axis direction can be decreased as compared with a case (FIG. 11) where rectangular reflection sheets 60 are formed by dividing a sheet base material 50A. The reflection sheets 60 has a width in the Y-axis direction set constant by the same width as the width Y1 of each of the light-source-surrounding reflecting portions 31 over the whole length. An area of the sheet base material can be decreased when the reflection sheets of the same number are formed, and cost can be decreased. In order to compare an area of the sheet base material 50 with an area of the sheet base material 50A in FIG. 9, the area of the sheet base material 50A is illustrated by two-dot chain lines.

Figure 11:
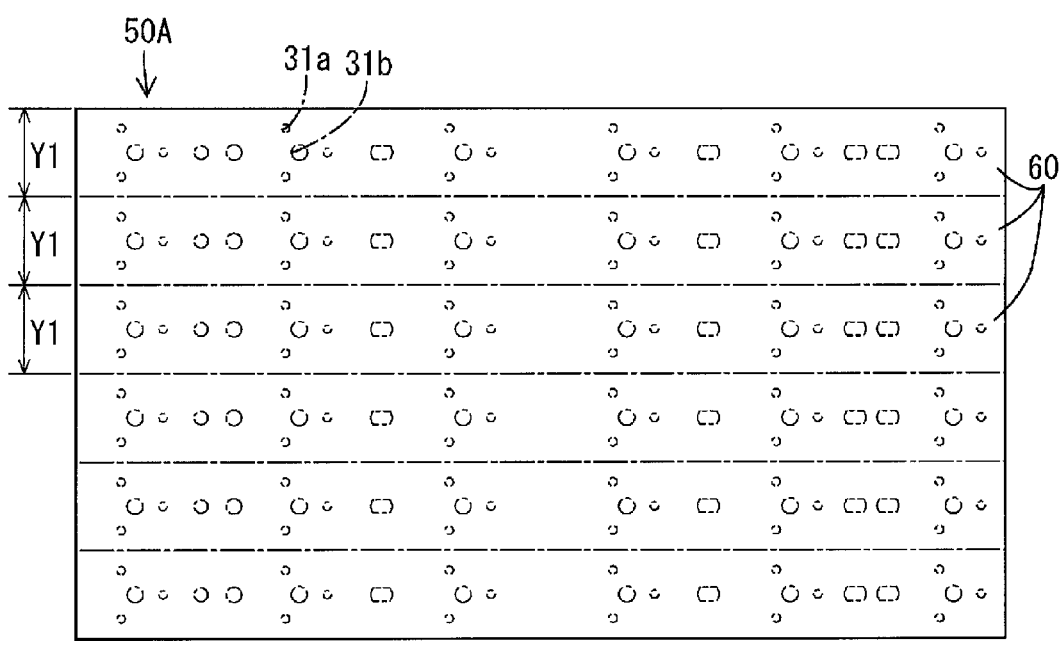
FIG. 11 is a plan view illustrating comparative example of the reflection sheets.

A method of allotting the reflection sheets 30 in the sheet base material 50 will be further described in detail. Each of the connecting portions 32 of each of the reflection sheets 30 has a length X2 in the X-axis direction preferably greater than a length X1 of each of the light-source-surrounding reflecting portions 31. Thus, as illustrated in FIG. 9, the whole area of a portion P1 (a portion protruding in the Y-axis direction from each of the connecting portions 32 in each of the light-source-surrounding reflecting portions 31B) of each of the light-source-surrounding reflecting portions 31B can be put in the region S1 whose three sides are surrounded by the adjacent light-source-surrounding reflecting portions 31 and the connecting portion 32 (hereinafter, a connecting portion 32A) connecting the light-source-surrounding reflecting portions 31. As a result, the light-source-surrounding reflecting portion 31B and the connecting portion 32A can be arranged in a state where they abut on or are brought close to each other. That is, as illustrated in FIG. 11, a distance YB between centers of the light-source-surrounding reflecting portions 31A and 31B can be decreased by YA (a value obtained by dividing a difference between a width of each of the light-source-surrounding reflecting portions 31 and a width of each of the connecting portions 32 in the Y-axis direction by 2) as compared with a case where the reflection sheets 60 having a constant width are provided over the whole length. When the number of the reflection sheets 30 formed from one sheet base material 50 is defined as N, a length in the Y-axis direction of the sheet base material 50 can be decreased by YA×(N−1) as compared with the method of allotting the reflection sheets of FIG. 11.

Figure 10:
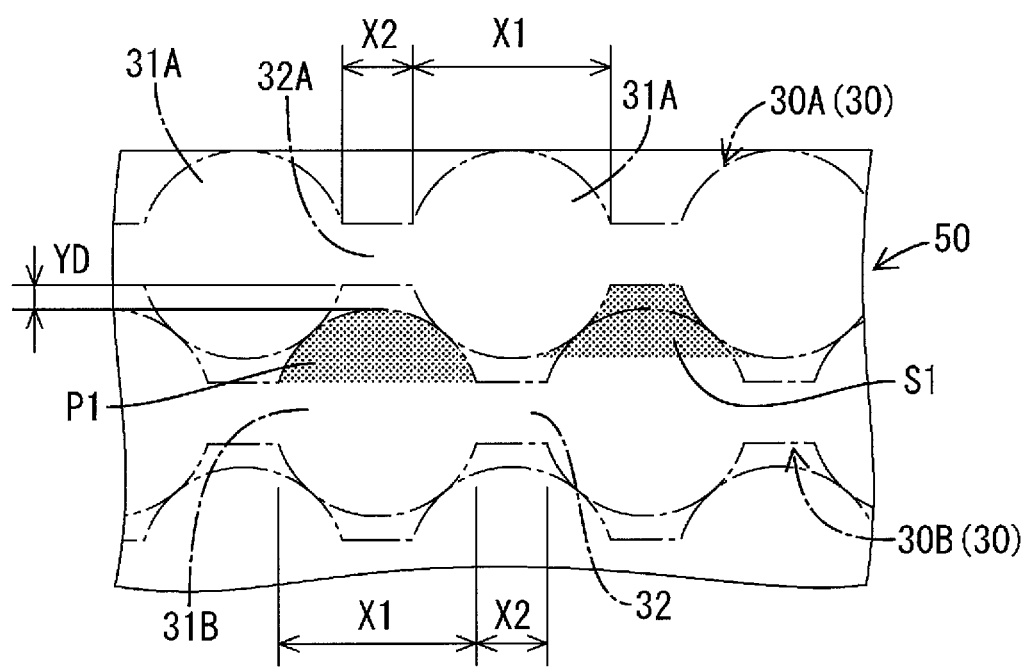
FIG. 10 is a view schematically illustrating comparative example regarding a method of allotting the reflection sheets.

The length X2 of each of the connecting portions 32 is supposedly defined to be smaller than the length X1 of each of the light-source-surrounding reflecting portions 31. As illustrated in FIG. 10, when each of the light-source-surrounding reflecting portions 31B is fitted between the adjacent light-source-surrounding reflecting portions 31A in this case, the portion P1 protruding from each of the connecting portions 32 in the Y-axis direction is partially put in the region S1. That is, even when each of the light-source-surrounding reflecting portions 31B and each of the connecting portions 32A are brought close to each other as much as possible, they cannot abut on each other, which produces an interval YD therebetween.

On the other hand, because each of the light-source-surrounding reflecting portions 31B and each of the connecting portions 32A abut on or are brought close to each other in the present embodiment, the interval YD shown in FIG. 10 can be minimized (almost zero). Thereby, a length in the Y-axis direction of the sheet base material 50 can be decreased as much as possible.

The light-source-surrounding reflecting portions 31A located on both end sides in a longitudinal direction of the reflection sheet 30A are referred to as light-source-surrounding reflecting portions 31AS. The light-source-surrounding reflecting portions 31B located on both end sides in a longitudinal direction of the reflection sheet 30B are referred to as light-source-surrounding reflecting portions 31BS. In this case, as illustrated in FIG. 9, a shift amount X3 of the reflection sheet 30B of the second stage in the X-axis direction is preferably set such that the light-source-surrounding reflecting portion 31AS and the light-source-surrounding reflecting portion 31BS abut on (or are brought close to) each other. Thus, a length in the X-axis direction of the sheet base material 50 can be decreased as compared with a case where the light-source-surrounding reflecting portion 31BS abuts on or brought close to the light-source-surrounding reflecting portion 31A (the second light-source-surrounding reflecting portion 31A from the left in FIG. 9) adjacent to each of the light-source-surrounding reflecting portions 31AS. As described above, length in the X-axis and the Y-axis of the sheet base material 50 can be decreased as much as possible by setting the length X1 of each of the light-source-surrounding reflecting portions 31, the length X2 of each of the connecting portions 32, and the shift amount X3 in the X-axis direction. Therefore, the area of the sheet base material 50 can be minimized.

(3) Advantageous Effect

As described above, in the light source units 40 according to the present embodiment, the plurality of light-source-surrounding reflecting portions 31 is connected by the connecting portions 32. Therefore, the present embodiment has improved ease of handling (for example, conveyance) of the reflection sheets as compared with a configuration supposedly including the plurality of light-source-surrounding reflecting portions separately without being connected. Therefore, cost reduction can be achieved. Each of the light-source-surrounding reflecting portions 31 surrounding each of the LEDs 16 needs to have a certain width in order to reflect the light from each of the LEDs 16. On the other hand, because each of the connecting portions 32 collaterally connects the light-source-surrounding reflecting portions 31, each of the connecting portion 32 may not necessarily have the same width as that of each of the light-source-surrounding reflecting portions 31. Then, each of the collateral connecting portions 32 has the width Y2 narrower than the width Y1 of each of the light-source-surrounding reflecting portions 31 in the short direction of each of the reflection sheets 30. Thereby, the total area of the reflection sheets 30 can be reduced as compared with the rectangular reflection sheet having the same width Y1 as that of each of the light-source-surrounding reflecting portions 31 over the whole length, and cost reduction can be realized. As described above, in the present embodiment, material cost of the reflection sheets 30 can also be reduced in addition to reduction of handling cost of the reflection sheets 30, and cost reduction can be greatly realized as a whole.

The method of manufacturing the board used for the light source unit of the present embodiment includes dividing the rectangular sheet base material 50 to form the plurality of reflection sheets 30 (reflection sheets for light source units). In the dividing step, the sheet base material 50 is divided into at least the reflection sheets 30A and 30B such that each of the light-source-surrounding reflecting portions 31B of the reflection sheet 30B adjacent to the reflection sheet 30A is allotted between the adjacent light-source-surrounding reflecting portions 31A in the reflection sheet 30A of the reflection sheets 30. Thus, the area of the sheet base material 50 can be reduced, and cost can be reduced.

Each of the reflection sheets 30 has an outer shape such that each of the light-source-surrounding reflecting portions 31A of the reflection sheet 30A can be fitted between the light-source-surrounding reflecting portions 31B of the other reflection sheet 30B. In the case of such a configuration, in the manufacturing process for dividing and forming the plurality of reflection sheets 30 from the sheet base material 50, the reflection sheets 30 can be arranged such that each of the light-source-surrounding reflecting portions 31 of the reflection sheet 30 is fitted between the light-source-surrounding reflecting portions 31 of the other reflection sheet 30. Such arrangement can reduce the area of the sheet base material 50, and can reduce cost.

Each of the connecting portions 32 in the longitudinal direction of the reflection sheet 30 has the length X2 greater than the length X1 of each of the light-source-surrounding reflecting portions 31. In such a configuration, in the manufacturing process of the reflection sheets 30, the reflection sheets 30 can be arranged such that each of the light-source-surrounding reflecting portions 31 of the other reflection sheet 30 abuts on or is brought close to each of the connecting portions 32 of each of the reflection sheets 30 when both the reflection sheets 30 are fitted. Therefore, the area of the sheet base material 50 can be reduced, and cost can be reduced.

Each of the LED boards 17 has the width Y5 of each of portions overlapping with at least the light-source-surrounding reflecting portions 31 in a plan view. The width Y5 is narrower than the width Y1 of each of the light-source-surrounding reflecting portions 31 in the short direction. In such a configuration, the area of the LED board can be reduced as compared with an LED board having a width of the LED board in the short direction set to be the same width as that of each of the light-source-surrounding reflecting portions. Thus, material cost of the LED board can be reduced.

The LEDs 16 are used as the light sources, and thereby power consumption can be suppressed. Diffusion lenses 24 configured to diffuse light from the LEDs 16 are provided. Thus, the light from the LEDs 16 is diffused by the diffusion lenses 24. Thereby, uniform brightness can be achieved while the arrangement interval between the LEDs 16 is increased (that is, while the number of the LEDs is reduced). As a result, when a uniform brightness distribution is required, the number of the LEDs can be reduced as compared with a case where the diffusion lenses 24 are not used, and cost can be reduced. The light-source-surrounding reflecting portions 31 of each of the reflection sheets 30 have the circular shape greater than the outer shape of each of the diffusion lenses 24. Therefore, the light reflected to the reflection sheet 30 side by the diffusion lenses 24 can be more certainly reflected by the light-source-surrounding reflecting portions 31.

In the backlight unit 12 (lighting device), the liquid crystal display device 10 (display device), and the television receiver TV according to the present embodiment, cost of each of the lighting devices can be reduced by using the low-cost light source units 40 as the components.

The backlight unit 12 includes the chassis-side reflection sheet 21 overlapping with the region where at least the reflection sheet 30 is not provided. The chassis-side reflection sheet 21 is provided on the surface of the chassis 14 to which the light source unit 40 is attached. The chassis-side reflection sheet 21 has the through holes 21A greater than the outer shape of each of the diffusion lenses 24 in a plan view formed in the places corresponding to the diffusion lenses 24 therein. The outer diameter of each of the light-source-surrounding reflecting portions 31 is greater than the diameter of each of the through holes 21A. Thus, the light can be reflected by the chassis-side reflection sheet 21 also in the region on which the reflection sheet 30 is not arranged by using the reflection sheet 30 in combination with the chassis-side reflection sheet 21. The region is provided on the surface to which the light source unit 40 of the chassis 14 is attached. Thereby, use efficiency of the light can be increased in combination with reflection caused by the reflection sheet 30, and a brightness can be increased.

In the present embodiment, the light source unit 40 including the diffusion lenses 24 is attached to the chassis 14. Therefore, the present embodiment provides good workability in attaching as compared with the configuration in which the diffusion lenses 24 are individually attached to the chassis 14, and can realize cost reduction. From the above circumstances, after the light source unit 40 is attached to the chassis 14, the chassis-side reflection sheet 21 is preferably attached. Then, in the present embodiment, the through holes 21A into which the diffusion lenses 24 can be inserted are formed in the chassis-side reflection sheet 21. Thereby, interference of the chassis-side reflection sheet 21 and diffusion lens 24 is prevented. In addition, the chassis-side reflection sheet 21 can be provided after the light source unit 40 is attached to the chassis 14. Furthermore, each of the light-source-surrounding reflecting portions 31 has a diameter greater than each of the through holes 21A, and thereby each of the light-source-surrounding reflecting portions 31 is provided in the almost whole area of each of the through holes 21A in a plan view. Thereby, light made incident on a region (in other words, a region which is not covered with the chassis-side reflection sheet 21 on the chassis 14) corresponding to each of the through holes 21A can be certainly reflected by each of the light-source-surrounding reflecting portions 31 while the through holes 21A are formed in the chassis-side reflection sheet 21, and brightness can further be increased.

The liquid crystal panel 11 using the liquid crystal as the display panel is used for the display device (liquid crystal display device 10) of the present embodiment. Such a liquid crystal display device 10 can be applied to a variety of applications such as a television display or a personal-computer display. Particularly, it is suitable for a large screen display. In the display device for the large screen display, a large number of the LEDs 16, that is, light source units 40 are required. Therefore, cost can be greatly reduced by provision of the above low-cost light source units 40, and it is effective to provide such low-cost light source units 40.

Second Embodiment

Figure 12:
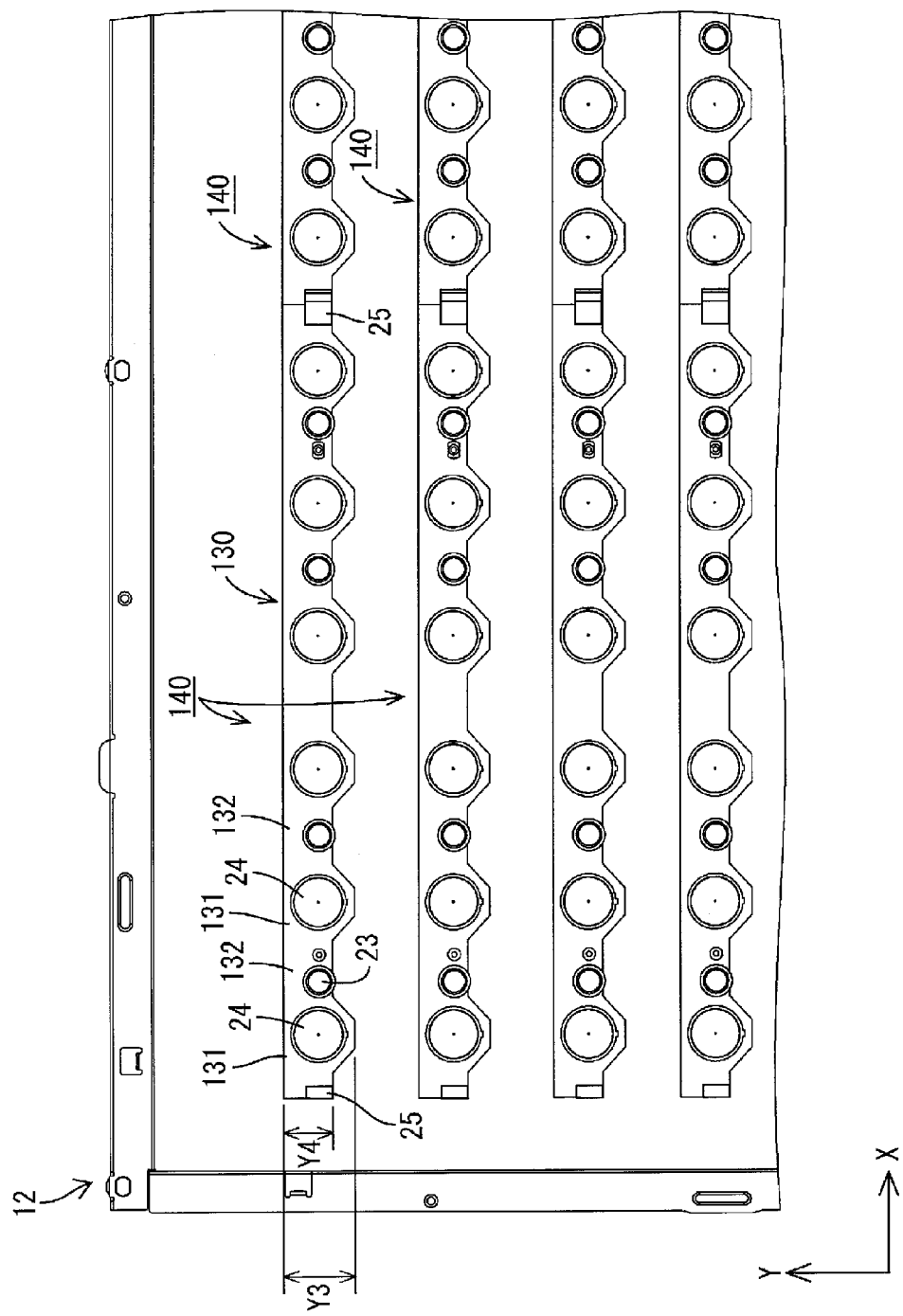
FIG. 12 is a plan view illustrating a light source unit according to a second embodiment of the present invention.
Figure 13:
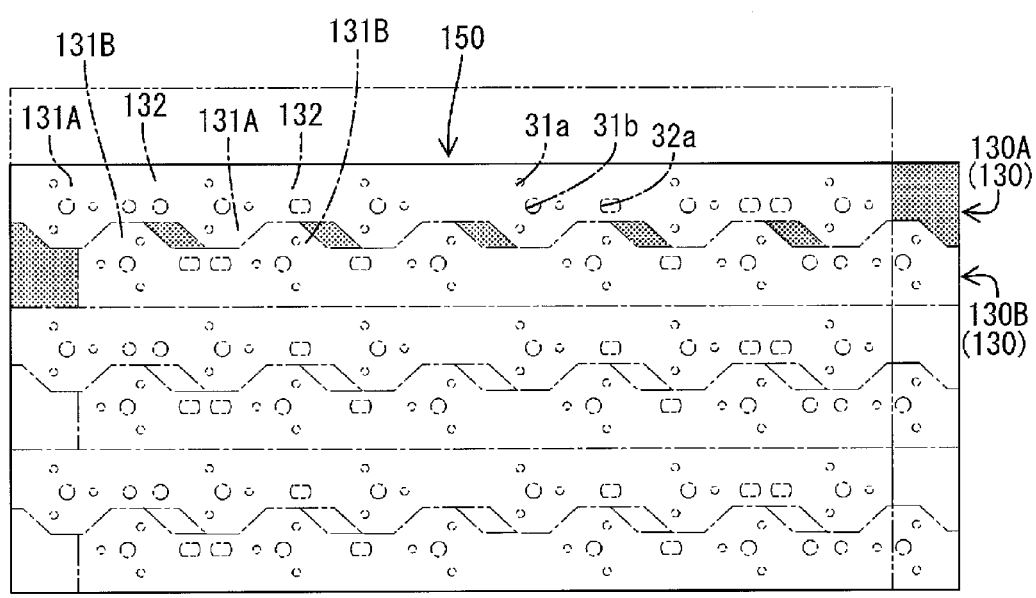
FIG. 13 is a plan view illustrating a method of manufacturing reflection sheets.

Next, a second embodiment of the present invention will be described with reference to FIGS. 12 to 13. A shape of each of reflection sheets in a light source unit 140 according to the second embodiment is different from that of the first embodiment. In the second embodiment, constituent parts having the same names as those of the above first embodiment are indicated by the same symbols without repeating overlapping descriptions of structures, operations, and effects. As illustrated in FIG. 12, each of reflection sheets 130 of the second embodiment has a substantially trapezoidal shape in a plan view. In this reflection sheets 130, each of light-source-surrounding reflecting portions 131 is greater than the outer shape of each of diffusion lenses 24. Each of connecting portions 132 is decentered to one end side (an upper end side in FIG. 12) of a Y-axis direction. The light-source-surrounding reflecting portions 131 and the connecting portions 132 of each of the reflection sheets 130 make one plane on the one end side of the Y-axis direction. Each of the reflection sheets 30 of the first embodiment has a 180-degree rotationally symmetric shape. By contrast, each of the reflection sheets 130 has an asymmetric shape in a vertical direction of FIG. 12. In a short direction, each of the connecting portions 132 has a width Y4 smaller than a width Y3 (a height of a trapezoid) of each of the light-source-surrounding reflecting portions 131.

The reflection sheets 130 are manufactured by dividing a sheet base material 150 such that the reflection sheets 130 are allotted as in each of the reflection sheets 30 according to the first embodiment. Next, a method of allotting the reflection sheets 130 in the sheet base material 150 when manufacturing the reflection sheets 130 will be described. FIG. 13 illustrates a state where a plurality of reflection sheets 130 is allotted from one rectangular sheet base material 150. In FIG. 13, for the purposes of illustration, the reflection sheet 130 of the first stage is designated by symbol 130A, and the reflection sheet 130 of the second stage is designated by symbol 130B.

After the reflection sheet 130B is rotated by 180 degrees to the reflection sheet 130A, the reflection sheet 130B is shifted in a longitudinal direction. Each of the light-source-surrounding reflecting portions 131 (hereinafter, light-source-surrounding reflecting portions 131B) in the reflection sheet 130B of the second stage (rotated reflection sheet) is arranged to be fitted between the light-source-surrounding reflecting portions 131 (hereinafter, light-source-surrounding reflecting portions 131A) in the reflection sheet 130A (un-rotated reflection sheet that is not rotated) substantially without any gaps. That is, when the reflection sheet 130 is rotated by 180 degrees, each of the rotated light-source-surrounding reflecting portions 131 has a shape such that each of the light-source-surrounding reflecting portions 131 can be fitted between the un-rotated adjacent light-source-surrounding reflecting portions 131 of the reflection sheet 130.

When the reflection sheets 130 are arranged as described above, a width YC obtained by totalizing width in the Y-axis direction of both the reflection sheets 130A and 130B can be reduced as compared with a case where the reflection sheets 130A and 130B are adjacent to each other in the Y-axis direction without fitting the reflection sheets 130A and 130B to each other. As a result, a length in the Y-axis direction of the sheet base material 150, consequently, an area thereof can be reduced, and cost thereof can be reduced. In this context, in each of the reflection sheets 130, the light-source-surrounding reflecting portions 131 and the connecting portions 132 make one plane on one end side of the Y-axis direction. Therefore, when the reflection sheet 130B rotated by 180 degrees is fitted to the reflection sheet 130A, an outer shape of both the reflection sheets 130A and 130B after being fitted is a substantially rectangular shape.

Therefore, when both the reflection sheet 130A and 130B are allotted in the rectangular sheet base material 150, areas of portions (hatching pattern places of FIG. 13) which are not used as the reflection sheets 130 can be reduced, and material cost thereof can be reduced. In order to allot the reflection sheets 130 such that the reflection sheets 130 are fitted to each other, it is necessary to allot the two reflection sheets 130 in one set. Therefore, it is preferable to design to form the reflection sheets 130 of even number from one sheet base material 150.

Third Embodiment

Figure 14:
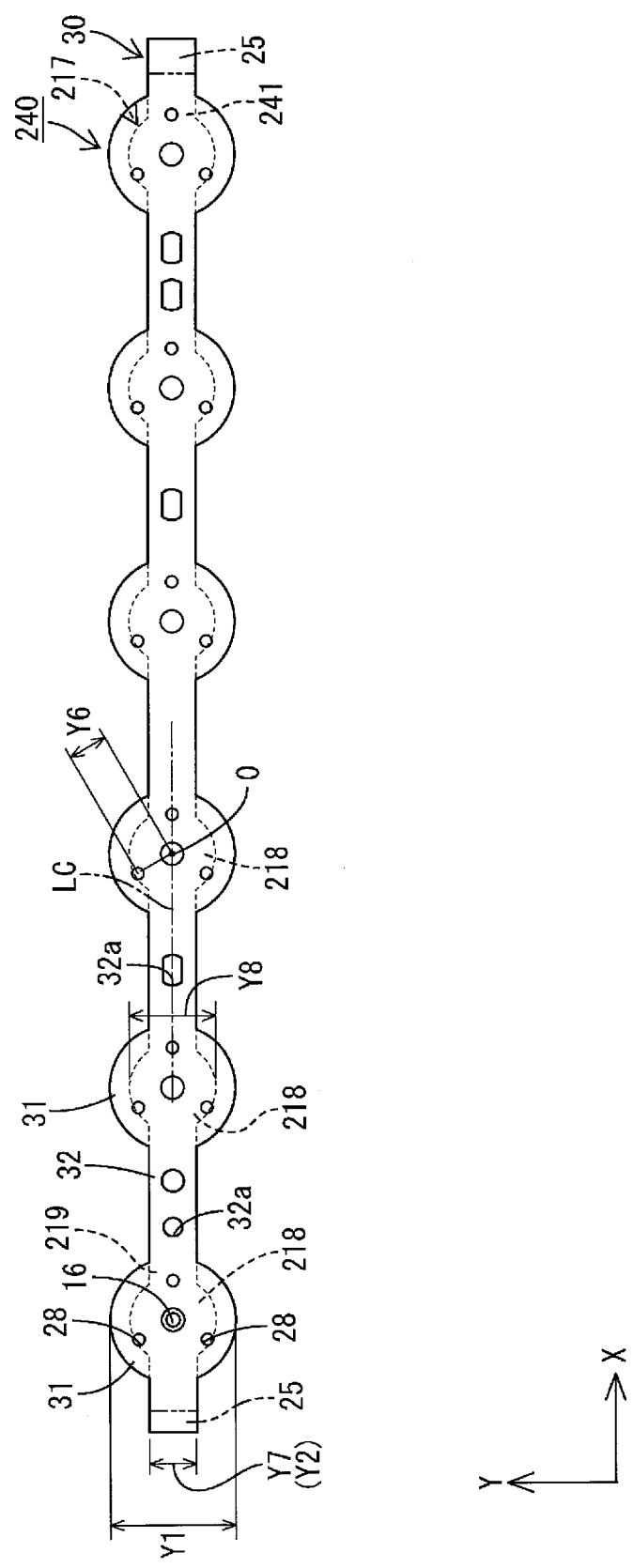
FIG. 14 is a plan view illustrating a light source unit according to a third embodiment of the present invention.
Figure 15:
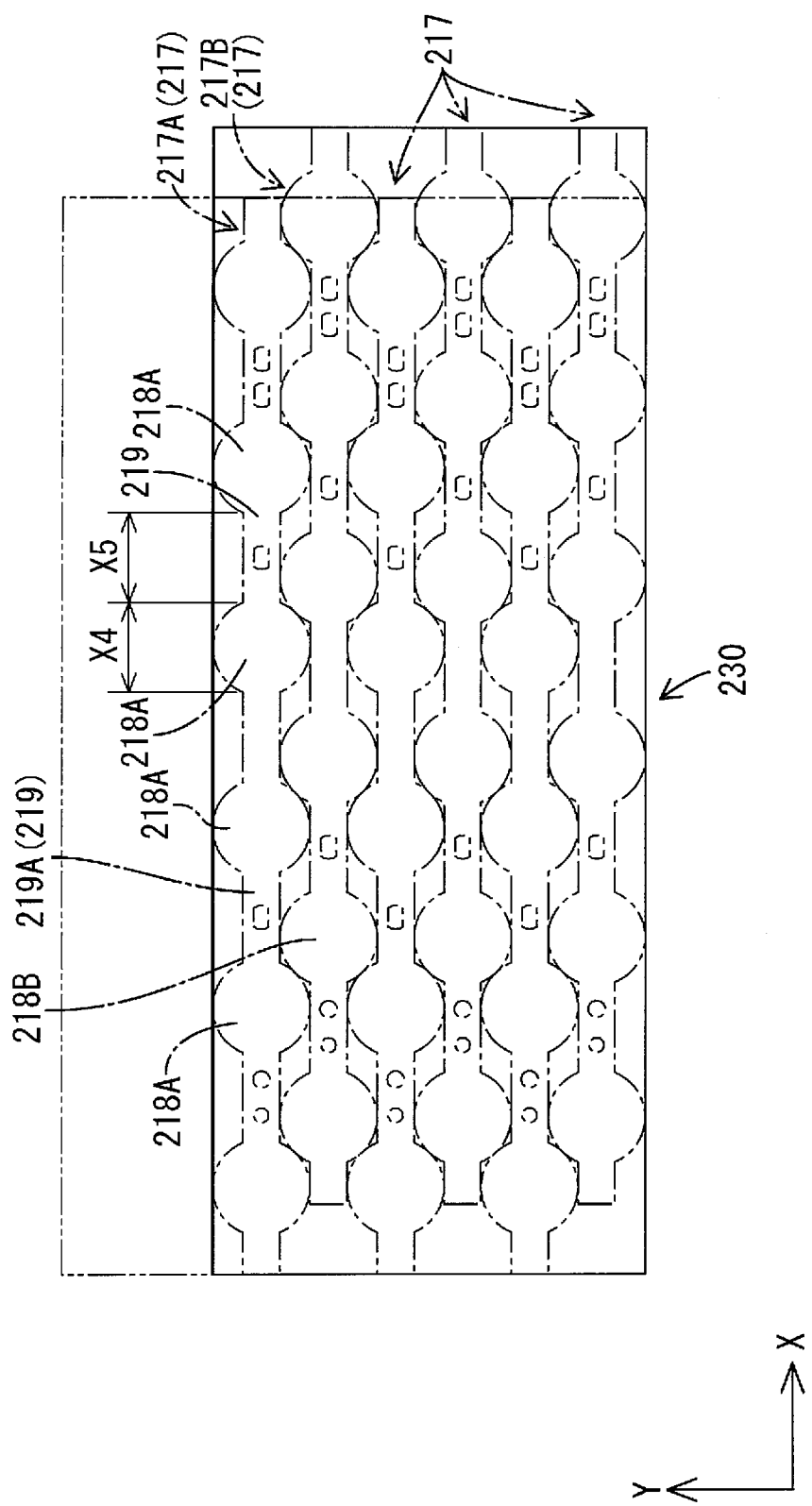
FIG. 15 is a plan view illustrating a method of manufacturing an LED board.

Next, a third embodiment of the present invention will be described with reference to FIGS. 14 to 15. A shape of each of LED boards in a light source unit 240 according to the third embodiment is different from that of the above embodiments. In the third embodiment, constituent parts having the same names as those of the above embodiments are indicated by the same symbols without repeating overlapping descriptions of structures, operations, and effects. Each of the LED boards 17 according to the above embodiments has a rectangular shape extending in an X direction. By contrast, each of LED boards 217 according to the third embodiment includes a plurality of light source arranging portions 218 on which LEDs 16 are arranged (mounted), a plurality of board-side connecting portions 219 connecting the adjacent light source arranging portions 218, and connector attaching portions 241 extending in an X-axis direction from the light source arranging portions 218 located on both end sides in a longitudinal direction. Each of the connector attaching portions 241 has a connector 25 mounted thereon.

Each of the light source arranging portions 218 has a circular shape having a diameter smaller than that of each of the light-source-surrounding reflecting portions 31 of each of the reflection sheets 30. Each of LEDs 16 and each of diffusion lenses 24 are mounted so as to be concentric to a center of each of the light source arranging portions 218. The light source arranging portions 218 are arranged at constant intervals along the X-axis direction. Each of the light source arranging portions 218 has a radius Y6 set to be substantially the same as a distance between a center (point 0) of each of the light source arranging portions 218 and each of leg portions 28 of each of the diffusion lenses 24 in a plan view. In other words, each of the light source arranging portions 218 is set to be the minimum size configured to support each of the diffusion lenses 24. In FIG. 14, the diffusion lenses 24 are omitted, and only the leg portions 28 are illustrated.

Each of the board-side connecting portions 219 has a long rectangular shape in the X-axis direction (a longitudinal direction of each of the LED boards 217). In addition, each of the board-side connecting portions 219 has a width Y7 in a Y-axis direction (a short direction of each of the LED boards 217) narrower than an outer diameter Y8 (a width in the Y-axis direction) of each of the light source arranging portions 218. This width Y7 is the same width as the width Y2 of each of the connecting portions 32. All lengths in the X-axis direction of the board-side connecting portions 219 are the same length. Each of the connector attaching portions 241 has a width same as a width of each of the board-side connecting portions 219 in the Y-axis direction. Each of the connector attaching portions 241 in the X-axis direction has a length smaller than a length of each of the board-side connecting portions 219.

In the above configuration, the light source arranging portions 218 are connected to each other, and thereby the configuration has improved ease of handling of the LEDs 16 or the light source unit 240 itself. In addition, the configuration can also realize cost reduction. Each of the light source arranging portions 218 needs to have a certain width (size) in order to arrange each of the LEDs 16 and each of the diffusion lenses 24. On the other hand, each of the board-side connecting portions 219 connects the light source arranging portions 218, and may not necessarily have the same width as that of each of the light source arranging portions 218. In the present embodiment, each of the collateral board-side connecting portions 219 has the width Y7 narrower than the width Y8 of each of the light source arranging portions 218 in the short direction of each of the LED boards 17. Thereby, the total area of the LED boards can be reduced as compared with the rectangular LED boards (for example, the LED boards 17 of the first embodiment) having the same width as that of each of the light source arranging portions 218 over the whole length. Thus, cost reduction can be realized. From the above, material cost of the LED boards 217 can also be reduced in addition to reduction of handling cost, and cost reduction can be greatly realized as a whole.

An outer shape of each of the LED boards 217 is the substantially same shape as that of each of the reflection sheets 30. The light source arranging portions 218 in each of the LED boards 217 correspond to the light-source-surrounding reflecting portions 31 in each of the reflection sheet 30. The board-side connecting portions 219 in each of the LED boards 217 correspond to the connecting portions 32 in each of the reflection sheets 30. Therefore, the LED boards 217 can be allotted on one base material (board base material 230) in the same manner as in the case where the reflection sheets 30 are allotted on the sheet base material 50.

A method of allotting the LED boards 217 will be specifically described with reference to FIG. 15. FIG. 15 illustrates a manufacturing method of forming a plurality of LED boards 217 from one board base material 230. In FIG. 15, for the purposes of illustration, the LED board 217 of the top stage is designated by symbol 217A, and the LED board 217 of the second stage is designated by symbol 217B. As described above, because the outer shape of each of the LED boards 217 is the substantially same shape as that of each of the reflection sheets 30, the LED boards 217A and the LED boards 217B are allotted such that each of the light source arranging portions 218B of each of the other LED boards 217B is fitted between the adjacent light source arranging portions 218A of each of the LED boards 217A in the same manner as in the time of manufacturing the reflection sheets 30. Thereby, one board base material 230 can be divided into the plurality of LED boards 217. Each of the board-side connecting portions 219 has a length X5 greater than a length X4 of each of the light source arranging portions 218 in the longitudinal direction of each of the LED boards 217 as in the configuration of each of the reflection sheets 30. Thereby, each of the light source arranging portions 218B can abut on (or be brought close to) the connecting portion 219 (designated by symbol 219A in FIG. 15) between both the light source arranging portions 218A. The area of the board base material 230 can be reduced as much as possible by the above allotting method as in the manufacture of the reflection sheets 30. From the above, in the present embodiment, cost reduction of the LED boards 217 can also be reduced in addition to cost reduction of the reflection sheets 30, and cost reduction can be greatly realized as a whole.

Other Embodiments

The present invention is not limited to the above embodiments described in the above description and the drawings. The following embodiments are also included in the technical scope of the present invention, for example.

(1) In the above embodiments, each of the light-source-surrounding reflecting portions 31 in each of the reflection sheets 30 has a circular shape or a trapezoidal shape. However, the present invention is not limited thereto. For example, each of the light-source-surrounding reflecting portions 31 may have a rectangular shape, a triangular shape, and a rhomboidal shape.

(2) In the above embodiments, the plurality of light-source-surrounding reflecting portions 31 has the same shape. However, the present invention is not limited thereto. Each of the reflection sheets 30 may include the light-source-surrounding reflecting portions 31 having different shapes.

(3) Materials and surface colors and the like of the reflection sheet 30 and the chassis-side reflection sheet 21 are not limited to the above embodiments. The reflection sheet 30 and the chassis-side reflection sheet 21 may be formed of any material and color as long as they have a function of reflecting the light.

(4) In the above first embodiment, the reflection sheet 30 having a relatively high reflectance are used, and the chassis-side reflection sheet 21 having a relatively low reflectance are used. However, the present invention is not limited thereto. The reflectance of the reflection sheet 30 and chassis-side reflection sheet 21 can be suitably selected. For example, the reflectance of the chassis-side reflection sheet 21 may be the same as that of the reflection sheet 30. The reflectance of the chassis-side reflection sheet 21 may be higher than that of the reflection sheet 30.

(5) In the above embodiments, each of the light source units 40 includes the diffusion lenses 24. However, each of the light source units 40 may not include the diffusion lenses 24. When each of the light source units 40 does not include the diffusion lenses 24, the size of each of the reflection sheets can also be smaller than the outer shape of each of the diffusion lenses 24.

(6) The shape and material and the like of each of the diffusion lenses 24 are not limited to the above embodiments. Each of the diffusion lenses 24 may be formed to any shape or formed of any material as long as they have a function of diffusing the light.

(7) In the above embodiments, the LEDs 16 including the blue light emitting LED chip and the fluorescent material are exemplified. However, the present invention is not limited thereto. For example, each of the LEDs 16 may include an ultraviolet-emitting LED chip and a fluorescent material. Or, each of the LEDs 16 may include three kinds of LED chips emitting R (red), G (green), and B (blue) single color light. The three kinds of LED chips emitting R (red), G (green), and B (blue) single color light may be combined.

(8) The configurations of the diffuser and optical sheet may be different from those of the above first embodiment, and can be suitably changed. Specifically, the number of the diffusers 15a, and the number and kind and the like of the optical sheets 15b can be suitably changed. A plurality of optical sheets 15b of the same kind can also be used.

(9) The number of the mounted LEDs 16 included in each of the light source units 40 is not limited to the numbers (five, six, eight) exemplified in the above embodiments. The LEDs 16 of the number other than the above numbers may be mounted on each of the light source units 40.

(10) In the above embodiments, the method of manufacturing the reflection sheet 30 corresponding to the LED board 17 on which six LEDs 16 are mounted is described as the example. The reflection sheet corresponding to the LED board having the different number of the LEDs 16 to be mounted can also be formed by the same manufacturing method as that of the present embodiment.

(11) In the method of manufacturing the reflection sheet 30 of the above first embodiment, the procedure of dividing the sheet base material to form the reflection sheets 30A and 30B is exemplified after the LED inserting holes 31b, the leg portion inserting holes 31a, and the attaching holes 32a are formed. However, the present invention is not limited thereto. The above procedure can be suitably changed. For example, the LED inserting holes 31b, the leg portion inserting holes 31a, and the attaching holes 32a may be formed after the reflection sheets 30A and 30B are formed.

(12) In the above third embodiment, the width Y7 of each of the board-side connecting portions 219 has the width Y7 as the same width as the width Y2 of each of the connecting portions 32. However, the present invention is not limited thereto. Each of the board-side connecting portions 219 may have the width Y7 narrower than the width Y2 of each of the connecting portions 32. Each of the connecting portions 32 may have the width Y2 narrower than the width Y7 of each of the board-side connecting portions 219.

(13) In the above embodiments, the LEDs 16 are two-dimensionally arranged in the chassis 14. However, the LEDs 16 may be one-dimensionally arranged. Specifically, the present invention includes arrangement of the LEDs 16 only in the vertical direction and arrangement of the LEDs 16 only in the horizontal direction.

(14) In the above embodiments, the LEDs 16 used as the point light sources is exemplified. However, the point light sources other than the LEDs may be used.

(15) In the above embodiments, the chassis 14 is arranged such that the short-side direction thereof aligned with the vertical direction. However, the chassis 14 may be arranged such that the longitudinal direction thereof aligned with the vertical direction.

(16) In the above embodiments, TFTs are used as switching elements of the liquid crystal display device. However, the technique can be applied to liquid crystal display devices including switching elements other than TFTs (for example, thin film diode (TFD)). The technique can be applied not only to color liquid crystal display devices but also to black-and-white liquid crystal display devices.

(17) In the above embodiments, the liquid crystal display device including the liquid crystal panel as a display element is exemplified. However, the present invention can be applied to display devices including other types of display elements.

(18) In the above embodiments, the television receiver including the tuner is exemplified. However, the present invention can be applied to a display device without a tuner.

The invention claimed is:

1. A light source unit comprising:
a plurality of light sources;
a plurality of boards; and
a plurality of reflectors, each including a plurality of light-source-surrounding portions arranged along a first direction and a connecting portion, wherein
each of the plurality of light-source-surrounding portions surrounds a corresponding one of the plurality of light sources in a plan view,
at least a portion of the connecting portion is located between a pair of the plurality of light-source-surrounding portions and has a dimension in a second direction perpendicular or substantially perpendicular to the first direction in the plan view which is smaller than a dimension of each of the pair of plurality of light-source-surrounding reflecting portions in the second direction,
each of the plurality of boards has an elongated shape and includes a plurality of light source arranging portions and at least one board-side connecting portion, each of the plurality of light source arranging portions being provided with corresponding ones of the plurality of light-source-surrounding portions and corresponding ones of the plurality of light sources thereon,
the at least one board-side connecting portion is arranged on a straight line directly between adjacent ones of the plurality of light sources to connect two of the plurality of light source arranging portions that are adjacent to each other on a same one of the plurality of boards, and
an outer shape of each of the plurality of boards defines a first width crossing at one of the plurality of light source arranging portions in the second direction and a second width crossing at the board-side connecting portion in the second direction, the second width is smaller than the first width.

2. The light source unit according to claim 1, wherein the connecting portions are provided on a straight line connecting centers of adjacent ones of the plurality of light-source-surrounding portions.

3. The light source unit according to claim 1, wherein each of the plurality of reflectors has an outer shape such that, when one of the plurality of reflectors is rotated by 180 degrees, each of the plurality of light-source-surrounding portions of the rotated one of the plurality of reflectors is fitted to a space between the plurality of light-source-surrounding portions of another one of the plurality of reflectors that is not rotated.

4. The light source unit according to claim 3, wherein each of the connecting portions has a length greater than a length of each of the plurality of light-source-surrounding portions in a longitudinal direction of the plurality of reflectors.

5. The light source unit according to claim 1, wherein:
each of the plurality of boards includes overlapping portions arranged to overlap with at least the plurality of light-source-surrounding portions in the plan view, and
each of the overlapping portions includes a width smaller than a width of each of the plurality of light-source-surrounding portions in the second direction.

6. The light source unit according to claim 1, wherein the plurality of light sources are light-emitting diodes.

7. The light source unit according to claim 5, further comprising diffusion lenses provided on the plurality of boards so as to cover the plurality of light sources and configured to diffuse light from the plurality of light sources,
wherein each of the plurality of light-source-surrounding portions has an area greater than each of the diffusion lenses in the plan view.

8. A lighting device comprising:
the light source unit according to claim 7;
a chassis including a surface to which the light source unit is attached; and
a chassis-side reflection sheet provided on the surface of the chassis to which the light source unit is attached so as to overlap with the plurality of reflectors, the chassis-side reflection sheet including through holes that are larger than an outer dimension of each of the diffusion lenses in the plan view in positions corresponding to the diffusion lenses, wherein
each of the plurality of light-source-surrounding portions has an area greater than a size of each of the through holes in a plan view.

9. A lighting device comprising:
the light source unit according to claim 1; and
a chassis to which the light source unit is attached.

10. The lighting device according to claim 9, wherein the chassis includes a surface to which the light source unit is attached, the lighting device further comprising a chassis-side reflection sheet overlapping with at least a portion of the surface of the chassis where the plurality of reflectors is not provided.

11. A display device comprising:
the lighting device according to claim 8; and
a display panel configured to provide display using light from the lighting device.

12. The display device according to claim 11, wherein the display panel is a liquid crystal panel using liquid crystals.

13. A television receiver comprising the display device according to claim 11.

14. The light source unit according to claim 1, wherein each of the plurality of light-source-surrounding portions includes a curved portion.

15. The light source unit according to claim 1, wherein the connecting portion has a rectangular shape.

16. The light source unit according to claim 1, wherein the connecting portion is arranged to engage with a clip.

17. The light source unit according to claim 1, wherein a plurality of the connection portions are provided.

* * * * *